(12) United States Patent
Blaikie, III et al.

(10) Patent No.: US 12,443,977 B2
(45) Date of Patent: Oct. 14, 2025

(54) CARBON CREDIT TOKENIZATION

(71) Applicant: Datavault AI Inc., Beaverton, OR (US)

(72) Inventors: Alfred Blair Blaikie, III, Tinton Falls, NJ (US); Nathaniel T. Bradley, Tucson, AZ (US); Joshua S. Paugh, Tucson, AZ (US)

(73) Assignee: DATAVAULT AI INC., Beaverton, OR (US)

( * ) Notice: Subject to any disclaimer, the term of this patent is extended or adjusted under 35 U.S.C. 154(b) by 252 days.

(21) Appl. No.: 17/874,069

(22) Filed: Jul. 26, 2022

(65) Prior Publication Data

US 2022/0358547 A1 Nov. 10, 2022

Related U.S. Application Data

(63) Continuation-in-part of application No. 17/704,905, filed on Mar. 25, 2022, which is a continuation of application No. 16/870,689, filed on May 8, 2020, now Pat. No. 11,315,150.

(60) Provisional application No. 63/242,123, filed on Sep. 9, 2021, provisional application No. 62/908,252, filed on Sep. 30, 2019, provisional application No. 62/845,057, filed on May 8, 2019.

(51) Int. Cl.
*G06Q 30/02* (2023.01)
*G06Q 30/0251* (2023.01)

(52) U.S. Cl.
CPC ..... *G06Q 30/0269* (2013.01); *G06Q 30/0255* (2013.01); *G06Q 30/0261* (2013.01)

(58) Field of Classification Search
CPC .......... G06Q 30/0255; G06Q 30/0261; G06Q 30/0269; Y02P 90/84
See application file for complete search history.

(56) References Cited

U.S. PATENT DOCUMENTS

| | | |
|---|---|---|
| 7,860,763 B1 | 12/2010 | Quinn |
| 8,204,805 B2 | 6/2012 | Eftekhari |
| 8,838,492 B1 | 9/2014 | Baker |
| 9,760,953 B1 | 9/2017 | Wang |
| 9,870,588 B1 | 1/2018 | Genov |

(Continued)

FOREIGN PATENT DOCUMENTS

| | | |
|---|---|---|
| CN | 108537664 A | 9/2018 |
| WO | WO-2016112099 A1 * | 7/2016 |

(Continued)

OTHER PUBLICATIONS

International Preliminary Report, PCT/US2019/059920, May 20, 2021, 8 pages.

(Continued)

*Primary Examiner* — Scott C Anderson
(74) *Attorney, Agent, or Firm* — Goodhue, Coleman & Owens, P.C.

(57) ABSTRACT

The illustrative embodiments provides a system, method, device, and platform for managing carbon credits utilizing tokens. Carbon credits associated with a unit of carbon emissions are received. The carbon credits are tokenized to create tokens associated with each of the carbon credits. The carbon credits are marketed to authorized parties. Transactions for the tokens associated with the carbon credits are performed. The transactions for the tokens are documented.

20 Claims, 10 Drawing Sheets

(56) References Cited

U.S. PATENT DOCUMENTS

| | | | |
|---|---|---|---|
| 10,114,969 B1 | 10/2018 | Chaney et al. | |
| 10,163,129 B1 | 12/2018 | Agarwal et al. | |
| 10,255,641 B1 | 4/2019 | Goldman | |
| 10,318,979 B2 | 6/2019 | Frank et al. | |
| 10,341,105 B2 | 7/2019 | Innes et al. | |
| 10,346,826 B2 | 7/2019 | Boudville | |
| 10,482,174 B1 | 11/2019 | Goodsitt | |
| 10,628,894 B1 | 4/2020 | Ioannou | |
| 10,685,407 B1 | 6/2020 | Cabrera | |
| 10,867,355 B1 | 12/2020 | Wang | |
| 10,943,309 B1 | 3/2021 | Morin | |
| 11,269,665 B1 | 3/2022 | Podgorny | |
| 2004/0128253 A1 | 7/2004 | Jim | |
| 2007/0250700 A1 | 10/2007 | Sidhu et al. | |
| 2007/0288312 A1 | 12/2007 | Wang | |
| 2009/0157534 A1 | 6/2009 | Arsiwala | |
| 2009/0292571 A1* | 11/2009 | Gil | G06Q 10/0637 208/100 |
| 2010/0076876 A1 | 3/2010 | Brady | |
| 2010/0179860 A1 | 7/2010 | Noel | |
| 2011/0208621 A1 | 8/2011 | Feierstein | |
| 2012/0323718 A1 | 12/2012 | Shkedi | |
| 2013/0132300 A1 | 5/2013 | Margolis | |
| 2014/0164251 A1 | 6/2014 | Loh | |
| 2014/0214636 A1 | 7/2014 | Rajsky | |
| 2014/0344015 A1 | 11/2014 | Puértolas-Montañés et al. | |
| 2014/0351014 A1* | 11/2014 | Lopez | G06Q 50/06 705/7.31 |
| 2015/0052025 A1* | 2/2015 | Apsley | G06Q 10/0836 705/26.81 |
| 2016/0104153 A1 | 4/2016 | Anderson | |
| 2016/0140668 A1 | 5/2016 | Maguire | |
| 2016/0342977 A1 | 11/2016 | Lam | |
| 2017/0011460 A1 | 1/2017 | Molinari | |
| 2017/0111345 A1 | 4/2017 | Heiman | |
| 2017/0126644 A1 | 5/2017 | Ullrich et al. | |
| 2017/0134161 A1 | 5/2017 | Goeringer et al. | |
| 2017/0169363 A1 | 6/2017 | Salmasi et al. | |
| 2017/0206523 A1 | 7/2017 | Goeringer et al. | |
| 2017/0214522 A1 | 7/2017 | Code et al. | |
| 2017/0220540 A1 | 8/2017 | Wang | |
| 2017/0221029 A1 | 8/2017 | Lund et al. | |
| 2017/0230109 A1 | 8/2017 | Kawai | |
| 2017/0243143 A1 | 8/2017 | Engstrom | |
| 2017/0295023 A1 | 10/2017 | Madhavan et al. | |
| 2017/0301026 A1 | 10/2017 | Bensemana | |
| 2017/0301031 A1 | 10/2017 | Naqvi | |
| 2017/0330174 A1 | 11/2017 | DeMarinis et al. | |
| 2017/0337534 A1 | 11/2017 | Goeringer et al. | |
| 2017/0346833 A1 | 11/2017 | Zhang | |
| 2017/0372278 A1 | 12/2017 | Frolov et al. | |
| 2018/0040073 A1 | 2/2018 | Ghosh | |
| 2018/0060836 A1* | 3/2018 | Castagna | G06Q 20/10 |
| 2018/0075406 A1* | 3/2018 | Kingston | H04L 9/0643 |
| 2018/0101771 A1 | 4/2018 | Schwarm | |
| 2018/0121337 A1 | 5/2018 | Unsal | |
| 2018/0144153 A1 | 5/2018 | Pead | |
| 2018/0144340 A1 | 5/2018 | Kinnaird et al. | |
| 2018/0218456 A1 | 8/2018 | Kolb | |
| 2018/0225693 A1 | 8/2018 | Postrel | |
| 2018/0232775 A1 | 8/2018 | Kim et al. | |
| 2018/0262493 A1 | 9/2018 | Andrade | |
| 2018/0276626 A1 | 9/2018 | Laiben | |
| 2018/0299852 A1* | 10/2018 | Orsini | G05B 19/042 |
| 2018/0300693 A1 | 10/2018 | Gopinath et al. | |
| 2018/0300772 A1 | 10/2018 | Bushong, Jr. | |
| 2018/0314884 A1 | 11/2018 | Lee | |
| 2018/0351949 A1 | 12/2018 | Scott et al. | |
| 2018/0365686 A1 | 12/2018 | Kondo | |
| 2019/0019208 A1 | 1/2019 | Postrel | |
| 2019/0019218 A1 | 1/2019 | Thompson et al. | |
| 2019/0026828 A1 | 1/2019 | Preston et al. | |
| 2019/0043050 A1 | 2/2019 | Smith et al. | |
| 2019/0050926 A1 | 2/2019 | Cooper | |
| 2019/0052722 A1 | 2/2019 | Gasking | |
| 2019/0058580 A1 | 2/2019 | Tormasov et al. | |
| 2019/0066063 A1 | 2/2019 | Jessamine | |
| 2019/0066205 A1 | 2/2019 | Marks | |
| 2019/0066206 A1 | 2/2019 | Marks | |
| 2019/0080402 A1 | 3/2019 | Molinari et al. | |
| 2019/0080407 A1 | 3/2019 | Molinari et al. | |
| 2019/0087844 A1 | 3/2019 | Leekley | |
| 2019/0087893 A1 | 3/2019 | Pellew | |
| 2019/0095439 A1 | 3/2019 | Cai | |
| 2019/0102454 A1 | 4/2019 | Sato et al. | |
| 2019/0102837 A1 | 4/2019 | Smith et al. | |
| 2019/0108516 A1* | 4/2019 | Jawaharlal | H04L 9/3239 |
| 2019/0114706 A1 | 4/2019 | Bell et al. | |
| 2019/0121813 A1 | 4/2019 | Galebach et al. | |
| 2019/0122243 A1 | 4/2019 | Mizzone | |
| 2019/0122258 A1 | 4/2019 | Bramberger et al. | |
| 2019/0130451 A1 | 5/2019 | Logvinov | |
| 2019/0141048 A1 | 5/2019 | Fallah et al. | |
| 2019/0147431 A1* | 5/2019 | Galebach | H04L 9/3247 705/44 |
| 2019/0147471 A1 | 5/2019 | McKelvey et al. | |
| 2019/0149633 A1 | 5/2019 | Evans et al. | |
| 2019/0155997 A1 | 5/2019 | Vos et al. | |
| 2019/0156000 A1* | 5/2019 | Hoffmann | H04L 9/3226 |
| 2019/0156304 A1 | 5/2019 | Hudson et al. | |
| 2019/0156363 A1 | 5/2019 | Postrel | |
| 2019/0163700 A1 | 5/2019 | Baumgardner et al. | |
| 2019/0164140 A1 | 5/2019 | Pasupula | |
| 2019/0172067 A1 | 6/2019 | Arora et al. | |
| 2019/0172153 A1 | 6/2019 | Wyle | |
| 2019/0180266 A1 | 6/2019 | Sidhu | |
| 2019/0180307 A1 | 6/2019 | Cohen et al. | |
| 2019/0188411 A1 | 6/2019 | Kroutik | |
| 2019/0205563 A1 | 7/2019 | Gonzales | |
| 2019/0205932 A1 | 7/2019 | Ericson | |
| 2019/0213633 A1 | 7/2019 | Kokernak | |
| 2019/0236214 A1 | 8/2019 | Kokernak | |
| 2019/0236286 A1 | 8/2019 | Scriber et al. | |
| 2019/0236698 A1 | 8/2019 | Postrel | |
| 2019/0244243 A1 | 8/2019 | Goldberg et al. | |
| 2019/0342095 A1 | 11/2019 | Simons | |
| 2019/0347442 A1 | 11/2019 | Marlin | |
| 2020/0058023 A1 | 2/2020 | Travizano | |
| 2020/0074461 A1 | 3/2020 | DeRosa-Grund | |
| 2020/0234268 A1 | 7/2020 | Kohli | |
| 2020/0236091 A1 | 7/2020 | Cooley | |
| 2020/0394723 A1 | 12/2020 | Baker | |
| 2021/0192075 A1 | 6/2021 | Sweeney | |
| 2022/0309540 A1 | 9/2022 | Blaikie, III | |
| 2022/0309541 A1 | 9/2022 | Blaikie, III | |

FOREIGN PATENT DOCUMENTS

| | | | |
|---|---|---|---|
| WO | 2017190175 A1 | 11/2017 | |
| WO | 2017197110 A1 | 11/2017 | |
| WO | 2018007828 A2 | 1/2018 | |
| WO | 2018058105 A1 | 3/2018 | |
| WO | 2018209153 A1 | 11/2018 | |
| WO | 2018211382 A1 | 11/2018 | |
| WO | 2019051401 A1 | 3/2019 | |
| WO | 2019083693 A1 | 5/2019 | |
| WO | 2019094153 A1 | 5/2019 | |
| WO | 2019099335 A1 | 5/2019 | |
| WO | 2019113138 A1 | 6/2019 | |
| WO | 2019121659 A1 | 6/2019 | |
| WO | 2019133309 A1 | 7/2019 | |
| WO | 2019152732 A1 | 8/2019 | |
| WO | WO-2020025141 A1 * | 2/2020 | G06Q 20/027 |
| WO | 2020097115 A1 | 5/2020 | |
| WO | 2020205642 A1 | 10/2020 | |

OTHER PUBLICATIONS

International Search Report & Written Opinion, PCT/US2020/025495, Jul. 2, 2020, 15 pages.

International Search Report and Written Opinions, PCT/US2022/075985, Dec. 6, 2022, 12 Pages.

(56) References Cited

OTHER PUBLICATIONS

Saraji et al. "A blockchain-based carbon credit ecosystem." (2021). Jul. 1, 2021 (Jul. 1, 2021} Retrieved on Oct. 24, 2022 (Oct. 24, 2022) from . 12 pages.

\* cited by examiner

CARBON CREDIT TOKENIZATION

PRIORITY

This application claims priority to U.S. Provisional Patent Application No. 63/242,123 filed Sep. 9, 2021 and is a continuation-in-part of U.S. patent application Ser. No. 17/704,905 filed on Mar. 25, 2022 which is a continuation of U.S. patent application Ser. No. 16/870,689 filed on May 8, 2020 now patented as U.S. Pat. No. 11,315,150 which claims priority to U.S. Provisional Patent Application Nos. 62/845,057 filed May 8, 2019 and 62/908,252 filed Sep. 30, 2019, respectively, each of which is hereby incorporated by reference in their entirety.

BACKGROUND

I. Field of the Disclosure

The illustrative embodiments relate to carbon credit tokenization. More, specifically, but not exclusively, the illustrative embodiments relate to a system, method, apparatus, and platform for the tokenization and transaction of carbon credits for the benefit of the environment and reduction of greenhouse gasses.

II. Description of the Art

Large amounts of carbon dioxide and other potential pollutants or greenhouse gases are released into the atmosphere daily. Many otherwise great companies have a large carbon footprint. High levels of carbon dioxide leads to disturbances of animals and their natural habitats, unnatural climate trends, rising sea levels, and other undesirable effects. Deforestation and forest degradation are one of the main causes of global warming. Existing carbon credits have failed to provide solutions that are centralized, easy to use, easy to perform transactions and verifications, and fit with digital expectations of modern-day users. Both human engineered and naturally created carbon removals are critical to capping temperature rises across the world. What is needed is a process of inclusion of standards, accreditation and safeguards that may further validate the carbon credit markets and provide the ability to rank and measure the quality and effectiveness of each carbon removal process, that better enables a company or an individual to potentially produce net zero carbon emissions.

SUMMARY OF THE DISCLOSURE

The illustrative embodiments provide a tracking and verification system, method, device, and platform for managing carbon credits utilizing tokens. Carbon credits associated with a unit of carbon emissions are received. The carbon credits are tokenized to create tokens associated with each purchase, utilization, and verification of the carbon credits. Transactions for the tokens associated with the carbon credits are performed. The transactions for the tokens are documented for the purpose of better tracking and validating carbon neutral certifications. Another embodiment provides a platform including a processor and a memory storing a set of instructions. The set of instructions are executed to perform the method herein described.

Another illustrative embodiment provides a system or platform for tokenizing carbon credits. The system includes electronic devices executing a data application. The data application is configured to capture the user data associated with a user. The system also includes a data platform accessible by the electronic devices that executes the data application. The data platform receives carbon credits associated with a unit of carbon emissions, tokenizes the carbon credits to create tokens associated with each of the carbon credits, markets the carbon credits to authorized parties, performs transactions for the tokens associated with the carbon credits, and documents the transactions for the tokens.

In other illustrative embodiments, utilization of the one or more carbon credits associated with one or more of the tokens as a retired credit may be recorded as associated with a non-fungible token. Authorized parties that are allowed to utilize the carbon credits and perform transactions for the tone or more tokens may be verified. The tokens may be blockchain tokens and may be documented on a digital ledger. The transactions may be performed utilizing currency and cryptocurrency. The one or more tokens may be generated utilizing information associated with the carbon credits. The transactions may be controlled utilizing a smart contract associated with the tokens and the carbon credits. The carbon credits may be marketed by providing an exchange for the carbon credits. The tokens associated with the carbon credits are partially usable or transactable (or transactable in partial tokens). A number of parties may own portions of the tokens. The carbon credits may be associated with a physical location or environmental cause (e.g., the Amazon, Rocky Mountain forest, supporting the Amazon, etc.). A significant portion of monies generated by the tokens and associated carbon credits are utilized to support efforts reducing or offsetting carbon usage. An exchange for the tokens may be a cap-and-trade market.

The illustrative embodiments provide a system, method, device, and data platform for tokenization of a precious physical assets, virtual assets, and data assets utilizing tokens. Information regarding the data asset, virtual asset or precious physical asset is determined. The precious data, virtual or physical asset is associated with one or more tokens. The one or more tokens represent ownership and proof of authenticity, of the precious asset type. Another embodiment provides a data platform including a processor and a memory storing a set of instructions. The set of instructions are executed to perform the method herein described.

Another embodiment provides a system for managing a precious physical asset or data asset utilizing one or more tokens. The system includes electronic devices executing a data application. The data application is configured to communicate information regarding the precious data assets or physical assets. The system also includes a data platform accessible by the electronic devices executing the data application through one or more networks. The data platform determines information regarding the precious asset, associates the precious asset with one or more tokens, communicates availability of the one or more tokens associated with the precious physical asset, implements transactions for the one or more tokens, and distributes monies paid during the transactions for the one or more tokens associated with the precious asset, wherein the one or more tokens represent ownership of the precious asset.

The illustrative embodiments provide a system, method, device, and data platform for obtaining corporate data associated with one or more corporations. The corporate data is received by a data platform. The corporate data is tokenized into one or more tokens. The corporate data is valued. Potential monetization strategies are determined for the corporate data. The monetization strategies are presented to one or more corporations. Another embodiment provides a data platform including a processor and a memory storing a set of instructions. The set of instructions are executed to perform the method herein described.

The illustrative embodiments provide a system, method, device, and platform for monetizing user data. One or more data elements associated with user data are received from one of a number of sources. One or more tokens are created based on the user data. The user data is stored in a secure location. The user data is vended to one of a number of parties utilizing the one or more tokens. The user data is accessible from the secure location utilizing an indicator included in the one or more tokens. The user is compensated for vending the user data. Another embodiment provides a processor for executing a set of instructions and a memory storing a set of instructions configured to perform the method herein described.

Another embodiment provides a system for tokenizing and monetizing user data. The system includes electronic devices executing a data application. The data application is configured to document or capture and tokenize the user data associated with a user. The system also includes a data platform accessible by the electronic devices executing the data application through one or more networks. The data platform receives one or more data elements associated with the user data of the user from one of a plurality of sources, creates one or more tokens based on the user data, store the user data in a secure virtual or physical location, the user profile may deny access to their data avatar, user data, or the user profile, until the profile approves, vaults, and vends access to user data and the data is monetized and is exchanged to one of a plurality of parties utilizing the one or more tokens, and compensates the user for vending the user data, wherein the data is accessible from the secure location utilizing an indicator included in the one or more tokens.

Another embodiment provides a system for utilizing user data virtually or through visual data capture. The system includes electronic devices executing a data application. The data application is configured to collect and capture the user data associated with a user. The system also includes a data platform accessible by the electronic devices executing the data application through one or more networks. The data platform receives one or more data elements associated with the user data from the electronic devices, automatically confirms the one or more data elements are applicable to the user, adds the one or more data elements to a data set associated with the user, determines whether the data set is complete after adding the data element to the data set, and creates one or more tokens based on the data set of the user.

Another embodiment provides a data platform. The data platform may include a processor for executing a set of instructions and a memory for storing the set of instructions. The set of instructions may be executed to receive one or more data elements associated with the user data from one of a number of sources, automatically confirm the one or more data elements is applicable to the user, add the one or more data elements to a data set associated with the user, determine whether the data set is complete after adding the data element to the data set, and create one or more tokens based on the data set of the user.

In other embodiments, one or more of the following may be implemented. Data vending instructions or smart contracts requirements are established and by any data owners specifying how the data set is utilized and the user profile or asset holder is compensated for sharing the tokens with one or more interested parties. Additional data elements may be requested in response to determining the data set is incomplete utilizing questions, surveys, and a user profile associated with the user. The one or more data elements are authenticated as being associated with the user. The token is a block chain crypto token and points or indicates the secure location to the data set for secure access by one or more interested parties who meet the smart contract criteria for access. Distinct data sets are clustered into a data pool, the data pool is cross populated with distinct data sets, and the data pool is segmented to identify data lifecycle, data desirability, marketability, value, and may also indicate problematic, unusable, stale, saturated, missing, incomplete, or nonrelevant data. A determination and in some cases a valuation is made regarding the relevance and value of the data pool to one or more interested parties. Payments are received from one or more interested parties to access the data set utilizing the token. One or more user profiles are compensated for granting access to their data sets. The interested parties may represent any data acquirer such as advertisers, marketers, purchasers, acquirers, parties, exchanges, or businesses that desire access to the user data in the data set.

The illustrative embodiments provide a system, method, and platform for monetizing data. A selection is received from a user to monetize data associated with the user. The data associated with user is compiled. A security token is generated including the data. The data is monetized utilizing the security token in accordance with the selection.

In other embodiments, the data may include digital profiles and data avatars that are monetized for data. Data validation may be performed through user opt-ins that are identified and confirmed by the user. Token based compensation for consumer data or assets allows for the direct control and monetization of their data (e.g., web data, application data, profiles, personal measurements, readings, etc.) and other tokenized data assets that allows any virtual or physical asset to act in the same fashion as a real-world physical asset that may be valued, sold, transferred, modified, frozen, revoked and even destroyed. Compensation may be performed through digital currencies, hard currencies, charitable contributions, and tax deductions. The earnings for a user may also be donated. Users may be rewarded for additional data uploads, updates, additions, amendments, surveys/questionnaire fulfillment, and so forth. The tokens may be utilized to pay a vendor or third party for a product, service, system, or data, secure a digital asset, tracking the life of an asset, share a stake in an asset or company, participate in an initial coin offering, receive a reward, maintaining and managing a digital asset, make a charitable contribution, or receive a tax deduction.

BRIEF DESCRIPTION OF THE DRAWINGS

Illustrated embodiments are described in detail below with reference to the attached drawing figures, which are incorporated by reference herein, and where.

DETAILED DESCRIPTION OF THE DISCLOSURE

Figure 1:
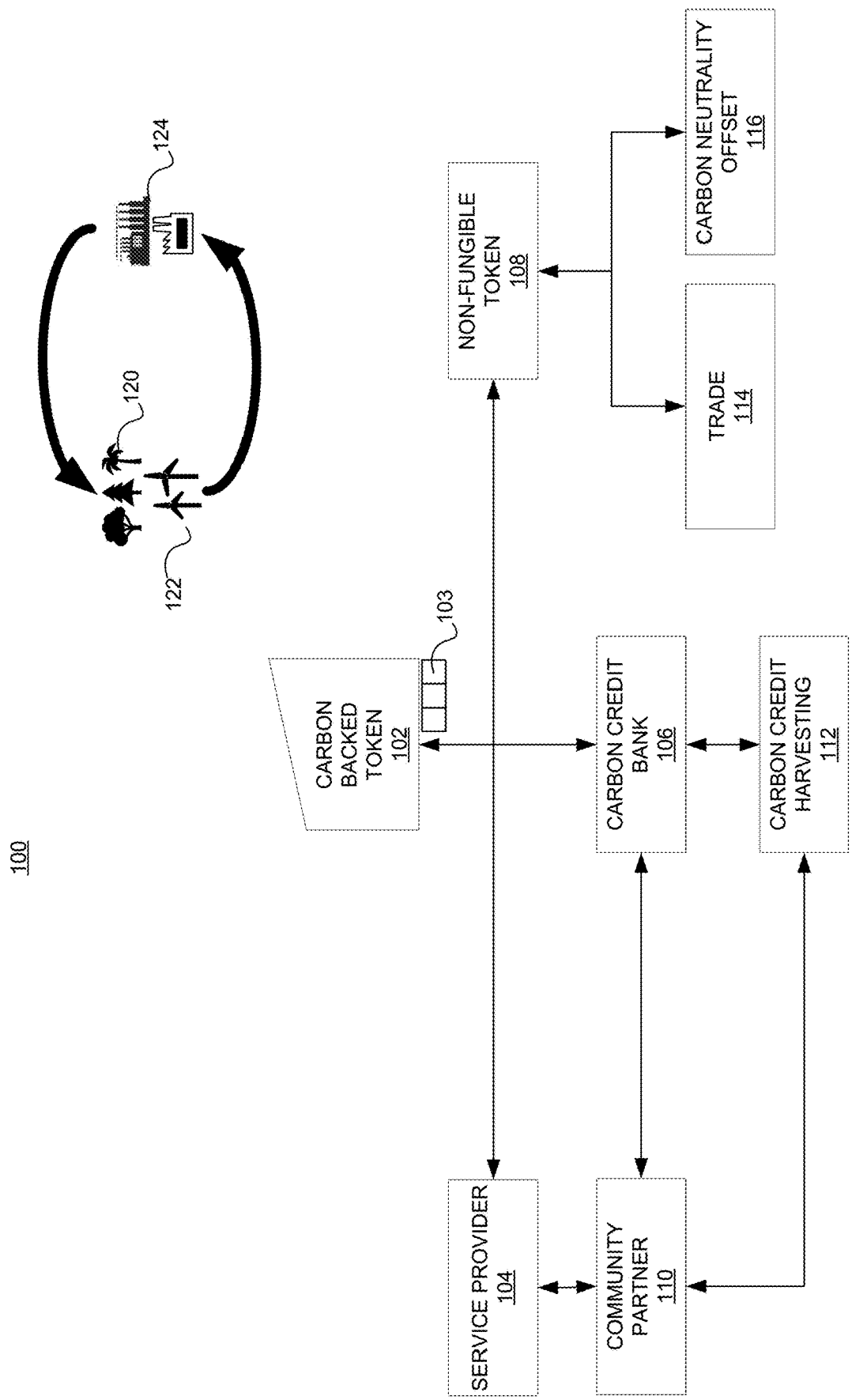
FIG. 1 is a pictorial representation of a system utilizing carbon backed tokens in accordance with an illustrative embodiment.

The illustrative embodiments provide a system, method, network, platform and devices for carbon credit tokenization and utilization. The illustrative embodiments are utilized to support efforts to become carbon neutral by reducing the world's carbon footprint for preserving rainforests, old growth forests, wetlands, and other threatened habitats, environments, climes, and areas while improving the quality of life of the indigenous populations of humans and animals. In one embodiment, carbon credits are tokenized and monetized to protect endangered areas. Endangered areas are protected from clear cut logging, farming, overgrazing, unsustainable commercialization, and other damaging or catastrophic practices.

The carbon credits are marketed via a cap-and-trade market creating an exchange value for emissions. The illustrative embodiments allow companies that have excess emissions credits to sell them for extra profit, which creates a new economic resource for industries or to other authorized parties or individuals interested in reducing or eliminating their carbon footprint. There are two distinct carbon credit markets. The regulated cap and trade market is a government regulatory program designed to measure and limit, or cap, the total level of emissions of carbon dioxide, as a result of industrial activity. The voluntary market is a free-market environment where businesses and individuals can buy credits to offset their carbon emissions that are a part of their everyday business practices.

A significant portion of the funds or monies generated by the monetization of the carbon credits are utilized to improve living conditions for indigenous populations by providing schools, clinics, decentralized electric power, water, sustainable environments, and improved food sources.

In one embodiment, each token holder may have the ability to buy the underlying credits from the asset holding vehicle at a fixed cost for the life of the token (e.g., eight dollars for a minimum of sixteen years). Purchases may be performed by a token holder for the notional value of credits backing the individual token or for a larger volume of credits across the entire bank of underlying carbon credits collateralizing the tokens.

Each blockchain token may be treated as a long-term call option on the underlying pool of carbon credits. A dividend like payment (i.e., reflection) may be made each time the token is exercised (e.g., purchase made) on the underlying pool of carbon credits assigned to the individual token that may create up to a 25% annual return. A new and unique non-fungible token is created when the call is exercised effectively purchasing the carbon credits by or from the token holder. The NFT will specifically be allocated to uniquely identify credits from the pool of carbon credits collateralizing the tokens and the carbon credits will be marked for retirement evidencing the offset of carbon footprint or kept open for re-trade based on the directions of the token holder.

Carbon credits are typically purchased from a government entity or other regulatory agency, by a company or individual for the purpose of reducing one ton of CO2 into the environment. Carbon offsets are produced by one party, such as a farm or as part of their normal business activities, which removes one ton of CO2 from the environment, which generates a carbon offset. When the farmer or company has an excess of carbon credits those parties may market or sell this excess of credits to other third parties who within their business practices create and excess of CO2 emissions and want to reduce their corporate carbon footprint. With this process companies are incentivized to reduce the emissions their business operations produce to monitor their business to ensure they stay within the CO2 emissions cap limits. For the purpose of the illustrative embodiments carbon credits may alternatively refer to and include carbon offsets. When carbon credits are bought, an NFT is generated to track the ownership and lifecycle of each carbon credit and to permanently identify the credits that have been purchased, utilized, and retired. The NFTs may be utilized to clearly identify the related carbon signature (property or item) being offset or may denote the purchase of carbon credit future out of the token base for a future sale, trade, or retirement. When the NFT is generated the carbon credits assigned to the transaction and any associated data are clearly identified in the NFT and permanently removed from the carbon credit bank (e.g., G.E.C. controls are removed).

Communities work closely with governmental authorities (e.g., national, state, provincial, tribal, etc.) in areas with areas, properties, and environments that need to be protected (e.g., rainforests, plains, grasslands, forests, etc.). The distribution of funds, revenue, or monies from the monetization of carbon credits may be overseen, monitored, or audited by any number of government, non-profit, for profit, or other entities, organizations, councils, businesses, and/or individuals. As a result, the funds are distributed to the farmers, land-owners, and others that actually care for, monitor, maintain, and protect the properties, areas, and/or environments. The funds may be utilized to build or maintain housing, schools/teachers, hospitals, roads, utilities (e.g., electricity, water, etc.), food production facilities, and so forth. As a result, the illustrative embodiments provide numerous social benefits and enhance long term sustainability of the protected areas.

FIG. 1 is a pictorial representation of a system 100 utilizing carbon backed tokens 102 in accordance with an illustrative embodiment. In one embodiment, the system 100 may utilize any number of processes, devices, equipment, and so forth. The system 100 may include a carbon backed token 102, a service provider 104, a carbon credit bank 106, a non-fungible token (NFT) 108, a community partner 110, and carbon credit harvesting 112.

The carbon backed token(s) 102 represents a carbon credit unit. The carbon backed token 102 may represent one or more carbon credits or may be the carbon credit itself. For example, the carbon backed token 102 may be purchased at a fixed cost of ten dollars per ton for the life of the token. The fixed cost may vary based on the market and inflation and may last a minimum amount of time, such as sixteen (16) years. The carbon backed token 102 may be minted by the service provider 104. In other embodiments, the carbon backed token 102 may be minted by any number of other groups, organizations, exchanges, or so forth. The service provider 104 may represent one or more exchanges that may manage transactions, minting, documentation, or so forth.

Each carbon backed token 102 may be effectively treated and managed as a long-term call option (leap) on an underlying pool of carbon credits 103. The system 100 is utilized to preserve natural resources 120, utilize renewable resources 122, and effectively manage the carbon output of various companies 124. In one embodiment, each carbon backed token 102 may be purchased at a fixed cost for a life of the token (e.g., $8 for 16 years, $10 for 20 years, etc.).

The system 100 provides a centralized platform and digital marketplace for managing carbon backed tokens 102. As shown, the companies 122 may have a large carbon footprint based on the amount of carbon released into the atmosphere daily based on the operations of the various aspects of the companies (e.g., manufacturing, mining, crypto mining, transportation, byproducts, cooling/air conditioning, power consumption, and so forth). Transactions involving the carbon backed tokens 102 may be associated with the underlying carbon credits that collateralize the carbon backed tokens 102. For example, the companies 122 with an excess of carbon output may desire to purchase some of the carbon backed tokens 102 as an offset to their carbon dioxide, pollution, or other emissions.

The system 100 illustrates any number of transactions, exchanges, or distributions of the carbon backed tokens 102. In one embodiment, the carbon backed tokens 102 may be purchased by a token holder for the notional value of carbon credits back by the carbon backed tokens 102. Larger or smaller transactions for carbon credits may be performed utilizing the carbon backed tokens 102. For example, large-volume transactions or partial token/carbon credit, transactions may be performed utilizing the system 100.

Purchases of the carbon backed tokens 102, generate a reflection payment (e.g., similar to a dividend) to the owner/token holder associated with the carbon backed token 102 that are purchased (e.g., call exercised).

In one embodiment, the system 100 may interact with the community partner 110 to implement transactions for the carbon backed tokens 102 and associated carbon credits. For example, the unique security identifier associated with the carbon backed tokens 102 may be utilized for transaction processing. For example, the carbon backed tokens 102 may be utilized for trades, retirements, or other transactions.

The carbon credit bank 106 may track and process any applicable payments of the carbon backed tokens 102 and associated carbon credits 103. The carbon credit bank 106 may be a specialized bank or may be a regular bank that caters to environmental preservation, carbon credits, blockchain, crypto currency, or so forth. The carbon bank may act as an independent body, separate from political influence, responsible for oversight and management of the carbon markets. Some companies may allow carbon credits to be banked and sold later in case the market price goes up. In another example, the carbon credit bank 106 may be integrated with the service provider 104. Alternatively, the carbon credit bank 106 may not be required at all. The community partner 110 may ensure that once verification of the carbon backed tokens 102 is performed, the appropriate payment for the associated carbon credits are implemented. A dividend like payment (i.e., reflection payment) may be made each time the carbon backed token 102 is exercised (e.g., purchase made) on the underlying pool of carbon credits 103 assigned to the individual token that may create up to a 25% annual return.

Upon payment clearance, the NFT 108 may be minted by the service provider 104 and subsequently processed by the community partner 110. The carbon credits 103 may be purchased out of the groups of tokens for future sale, trade, or retirement and may be held as an NFT 108. The NFT 108 may be utilized to identify the carbon credits 103 that have been retired. When the NFT 108 is generated, the carbon credits 103 assigned to the transaction (or trade 114) are clearly identified by the NFT 108 and may be permanently removed from the carbon credit bank 106 (and control of the carbon credit bank 106).

The service provider 104 may be the repository and manager of the carbon backed tokens 102. As shown, the carbon backed tokens 102 may be traded, purchased, exchanged, or otherwise transacted. The carbon neutrality offset 116 may represent the funds, monies, cryptocurrency, or other payment that offsets utilization of the carbon credits associated with the non-fungible token 108 and/or carbon backed tokens 102.

Trade 114 represents one or more trades of the NFT 108 that may be implemented through one or more systems, platforms, and/or exchanges. An exchange may be the repository and manager of the inventory of the carbon credits 103 for the carbon credit bank 106 collateralizing the carbon backed tokens 102 and the volume of carbon credits 103 associated with each of the carbon backed tokens 102.

Figure 2:
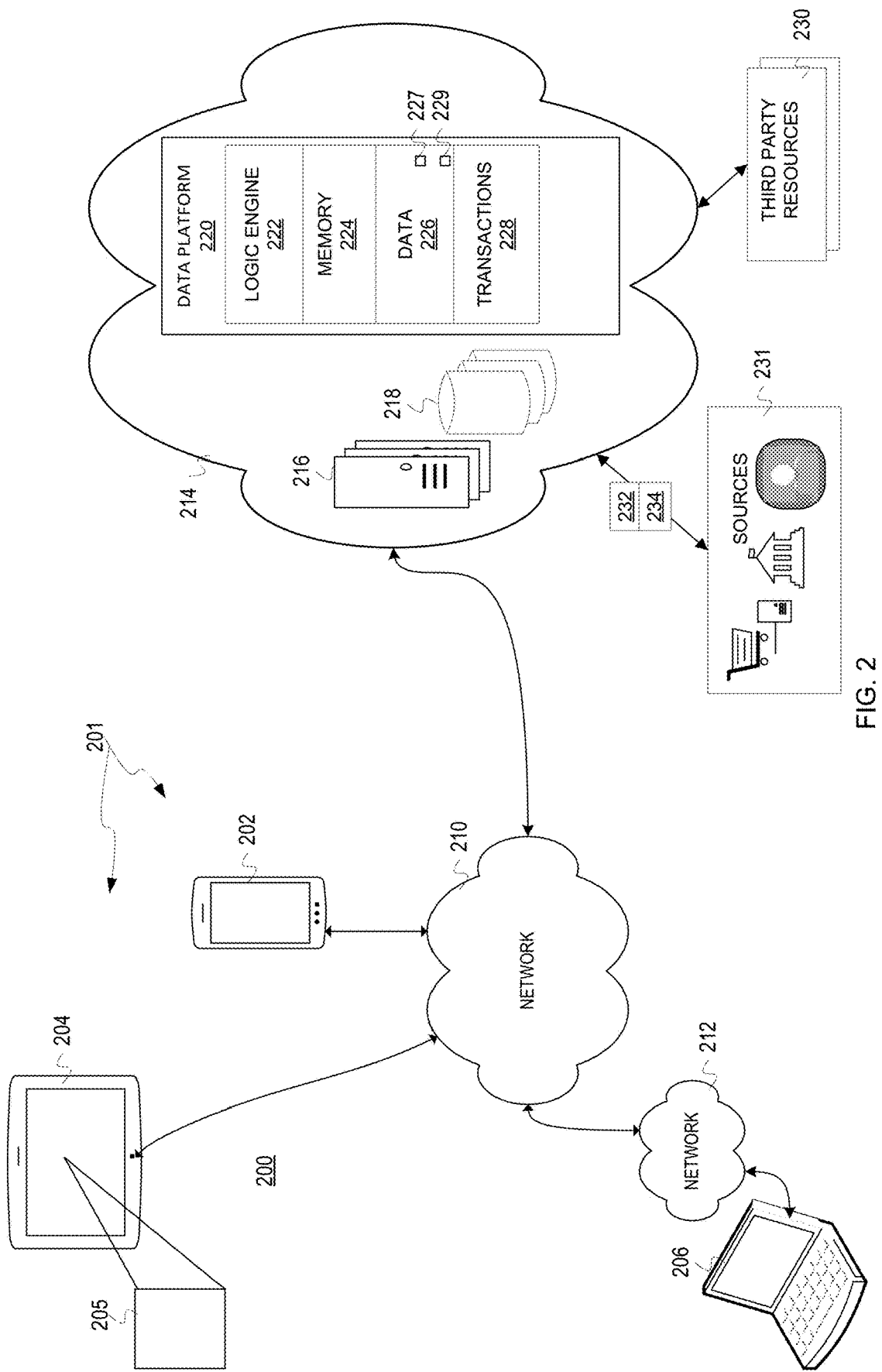
FIG. 2 is a pictorial representation of a system for managing carbon credits in accordance with an illustrative embodiment.

FIG. 2 is a pictorial representation of a system 200 for managing carbon credits in accordance with an illustrative embodiment. In one embodiment, the system 200 of FIG. 2 may include any number of devices 201, networks, components, software, hardware, and so forth. In one example, the system 200 may include a smart phone 202, a tablet 204 displaying graphical user interface 205, a laptop 206 (altogether devices 201), a network 210, a network 212, a cloud system 214, servers 216, databases 218, a data platform 220 including at least a logic engine 222, a memory 224, data 226, tokens 227, carbon credits 229, and transactions 228. The cloud system 214 may further communicate with sources 231 and third-party resources 230. The various devices, systems, platforms, and/or components may work alone or in combination.

Each of the devices, systems, and equipment of the system 200 may include any number of computing, blockchain, and telecommunications components, devices or elements which may include processors, memories, caches, busses, motherboards, chips, traces, wires, pins, circuits, ports, interfaces, cards, converters, adapters, connections, transceivers, displays, antennas, operating systems, kernels, modules, scripts, firmware, sets of instructions, and other similar components and software that are not described herein for purposes of simplicity.

In one embodiment, the system 200 may be utilized by any number of users, organizations, or providers to aggregate, manage, review, analyze, process, distribute, advertise, market, display, and/or monetize tokens 227, carbon credits 229, and data 226. The data 226 may be related to the utilization of carbon and/or other potential pollutants, byproducts, or emissions that need to be minimized. The data 226 may include business data, commercial data, personal data, data sets, data pools, and other forms of data. For example, the data 226 may be utilized in creating, utilizing, marketing, or advertising the tokens 227 and the associated carbon credits 229.

In one embodiment, the system 200 may utilize any number of secure identifiers (e.g., passwords, pin numbers, certificates, tones, proof of authority (PoA) validators, etc.), secure channels, connections, or links, virtual private networks, biometrics, or so forth to upload, manage, and secure the data 226, tokens 227, and carbon credits 229, and perform applicable transactions. As noted, the system 200 may be a blockchain system that utilizes a digital ledger (within database 218 or memory 224) to track tokens 227, transactions 228 involving the data 226 and carbon credits 229. For example, the digital ledger may store the data 226, tokens 227, transactions 228, and carbon credits 229 along with their details, information, and data. The devices 201 are representative of multiple devices that may be utilized by businesses or consumers, including, but not limited to the devices 201 shown in FIG. 2. The devices 201 utilize any number of applications, browsers, gateways, bridges, or interfaces to communicate with the cloud system 214, platform 220, and/or associated components. The devices 201 may include any number of Internet of Things (IoT) devices.

The data 226 may include a number of different data types. The data 226 may include carbon-use data, manufacturing data, vehicle data, travel data, demographic data, consumer data, commercial data, property data, ownership data, purchase data, behavioral data, interests and activity data, and other applicable types of data.

The wireless device 202, tablet 204, and laptop 206 are examples of common devices 201 that may be utilized to capture, receive, communicate, and manage data 226, tokens 227, and carbon credits 229 as well as perform any necessary transactions 228. For example, the various devices may capture data relevant to the business, organization entity, group, collaboration, and/or user that is subsequently monetized for the benefit of the user (e.g., location, manufacturing, purchases, behavior, web activity, application use, digital purchases, etc.). Other examples of devices 201 may include e-readers, cameras, video cameras, electronic tags, audio systems, gaming devices, vehicle systems, kiosks, point of sale systems, televisions, smart displays, monitors, entertainment devices, medical devices, virtual reality/augmented reality systems, or so forth. The devices 201 may communicate wirelessly or through any number of fixed/hardwired connections, networks, signals, protocols, formats, or so forth. In one embodiment, the smart phone 202 is a cell phone that communicates with the network 210 through a 5G connection. The laptop 206 may communicate with the network 212 through an Ethernet, Wi-Fi connection, cellular, or other wired or wireless connection. The availability and utilization of so many devices 201 makes utilization of the carbon backed tokens and carbon credit processes available to many different users, businesses, stakeholders, and other participants.

The data 226 may be collected and sourced from any number of online and real-world sources including, but not limited to, regulatory and legal reports and filings, self-reported data, clearinghouses (e.g., stocks, credit card transactions, etc.), website traffic and cookie-based analytics, social media, application data, point of sale, purchase, and transaction history, payment services, location-based data, surveys and questionnaires, and other applicable sources. The data 226 may be captured based on the permissions, authorization, and confirmation of the user (whether a business, organization entity, collaboration, or individual). For example, the data 226 may include manufacturing, location, customer, acquisition, and other applicable data related to the business or practices of the business. The data 226 may also store information regarding a businesses' purchases (e.g., past, present, future, likely, etc.), interests (e.g., personal, commercial, etc.), needs, and other applicable information.

These same data collection sources may be utilized to perform analysis of the data 226. In one embodiment, the data 226 may be captured through registered account information, programs/applications, website traffic, and tracking cookie-based analytics. For example, information, such as time spent on each site, page views, clicks, conversions, relevant content, trends, and other information may be recorded as part of the data 226. The data 226 may also include digital or online transactions performed through services, such as PayPal, Venmo, Zelle, Google, Square, WePay, Skrill, Payza, Stripe, Dwolla, Amazon Pay, 2checkout, and other similar commercial, consumer, industrial, or retail services.

The illustrative embodiments may be utilized for both commercial/industrial, for profit, non-profit, and consumer applications. As a result, the data 226, tokens 227, and carbon credits 229 may be utilized for those same users, individuals, entities, or groups. The data 226 may be captured through social media and applications. Social media data may be utilized to provide real-time polls, surveys, questionnaires, likes and dislikes, feedback, preferences for media content, site traffic, interests, and numerous other consumer data. Any number of mobile, computing, personal assistant (e.g., Sin, Alexa, Cortana, Google, etc.), or other applications may be utilized. Social media data may be utilized as definitive or anecdotal data.

The data 226 may also be captured through point of sale (POS) transactions, card transactions, in-person purchase, digital purchases, and purchase history. In one embodiment, a credit card clearing house may be utilized to capture the data. Customers, consumers, and clients may be comfortable with sharing the specific data points associated with point-of-sale transactions due to established practices. The point-of-sale transactions may include extensive data, including, but not limited to, name, address, item/service, price, credit card type, purchase location, date, brand preference, brand category, product affinity, spending levels, order history, inventory, restock data, purchase demographics, and so forth. Point-of-sale and transaction history data may have static, perennial, and influx data points with the value of each data point being tracked and measured within the data valuation index and the data derivatives marketplace.

The data 226 may also include location-based information and communications. An example of static and perennial data points that may be collected include a standard web form, email request form, wireless triangulation, routers/towers/access points reached, proximity beacons, and so forth. The location-based communications may capture data, such as email, consumer/business addresses, phone numbers, and so forth.

The data 226 may also include surveys and questionnaires. Responses to surveys and questionnaires may be one of the best ways to gather and inform information regarding the user's business, carbon emissions/footprint, demographics, interests, and preferences that may not be able to be determined in other ways due to privacy, entity names, applicable laws, and so forth. The ability to gather real-world consumer insights may help complete or round out a user profile. The surveys and questionnaires may be performed digitally (e.g., websites, extensions, programs, applications, browsers, texting, or manually (e.g., audibly, on paper, etc.). Responses to surveys and questionnaires may help achieve saturation of datapoints for user profiles.

The cloud system 214 may aggregate, manage, analyze, and process data 226, tokens 227, and carbon credits 229 across the Internet and any number of networks, sources 231, and third-party resources 230. For example, the networks 210, 212, and the cloud system 214 may represent any number of public, private, virtual, specialty (e.g., trading, financial, cryptocurrency, etc.), or other network types or configurations. The different components of the system 200, including the devices 201 may be configured to communicate using wireless communications, such as Bluetooth, Wi-Fi, or so forth. Alternatively, the devices 201 may communicate utilizing satellite connections, Wi-Fi, 3G, 4G, 5G, LTE, personal communications systems, DMA wireless networks, and/or hardwired connections, such as fiber optics, T1, cable, DSL, high speed trunks, powerline communications, and telephone lines. Any number of communications architectures including client-server, network rings, peer-to-peer, n-tier, application server, mesh networks, fog networks, or other distributed or network system architectures may be utilized. The networks, 210, 212, and the cloud system 214 of the system 200 may represent a single communication service provider or multiple communications services providers.

The sources 231 may represent any number of carbon credit specialists, regulators, banks, clearing houses, web servers, service providers (e.g., trading platforms, credit card companies, transaction processors, etc.), distribution services (e.g., text, email, video, etc.), media servers, platforms, distribution devices, or so forth. In one embodiment, the sources 231 may represent the businesses that purchase, license, or utilize the data 226, such as advertising or marketing goods and services utilizing the system 200. In one embodiment, the cloud system 214 (or alternatively the cloud network) including the data platform 220 is specially configured to perform the illustrative embodiments and may be referred to as a system or platform.

The cloud system 214 or network represents a cloud computing environment and network utilized to aggregate, value, process, utilize, manage, generate, sell, monetize, measure efficiency, and distribute data 226, tokens 227, and carbon credits 229 while supporting the transactions 228. The cloud system 214 may implement a blockchain system for managing the data 226, tokens 227, carbon credits 229, and transactions 228. For example, any number of blockchain tokens may be utilized to manage the data and ensure proper compensation of the user. The cloud system 214 allows data 226, tokens 227, carbon credits 229, and transactions 228 from multiple businesses, users, managers, or service providers to be centralized. In addition, the cloud system 214 may remotely manage configuration, software, and computation resources for the devices of the system 200, such as devices 201. The cloud system 214 may prevent unauthorized access to data 226, tools, and resources stored in the servers 216, databases 218, and any number of associated secured connections, virtual resources, modules, applications, components, devices, or so forth. In addition, a user may more quickly upload, aggregate, process, manage, view, and distribute data 226 (e.g., profiles, updates, surveys, photos, GPS coordinates, content, etc.), tokens 227, carbon credits 229, and transactions 228 where authorized, utilizing the cloud resources of the cloud system 214 and data platform 220.

The cloud system 214 allows the overall system 200 to be scalable for quickly adding and removing users, businesses, authorized sellers, interest-based information, transaction-based information, analysis modules, distributors, valuation logic, algorithms, moderators, programs, scripts, filters, transaction processes, distribution partners, or other users, devices, processes, or resources. Communications with the cloud system 214 may utilize encryption, secured tokens, secure tunnels, handshakes, secure identifiers (e.g., passwords, pins, keys, scripts, biometrics, etc.), firewalls, digital ledgers, specialized software modules, or other data security systems and methodologies as are known in the art.

Although not shown, the cloud system 214 may include any number of load balancers or other devices. The load balancer is one or more devices configured to distribute the workload of processing the uploaded data 226 as well as applicable transactions to optimize resource utilization, throughput, and minimize response time and overload. For example, the load balancer may represent a multilayer switch, database load balancer, or a domain name system server. The load balancer may facilitate communications and functionality (e.g., database queries, read requests, write requests, command communications, stream processing, etc.) between the devices 201 and the cloud system 214. For example, the cloud system 214 may offload verification of users that seek to be added to the system 200 along with applicable data 226 and information. Load balancing may be performed between automatic systems and devices as well as individual users. Other intelligent network devices may also be utilized within the cloud system 214.

The servers 216 and databases 218 may represent a portion of the data platform 220. In one embodiment, the servers 216 may include a web server 217 utilized to provide a website, mobile applications, and user interface (e.g., user interface 207) for interfacing with numerous users. Information received by the web server 217 may be managed by the data platform 220 managing the servers 216 and associated databases 218. For example, the web server 217 may communicate with the database 218 to respond to read and write requests. For example, the servers 216 may include one or more servers dedicated to implementing and recording blockchain transactions and communications involving the data 226, tokens 227, carbon credits 229, and transactions 228. For example, the databases 218 (or the memory 224) may be or store a digital ledger for updating information relating to the user's data 226 and transactions 228 as well as utilization of the data 226 and transactions 228 to generate and communicate the carbon credits 229. For example, the user's data 226 may be packaged in digital tokens that may be securely communicated to any number of relevant parties.

The databases 218 may utilize any number of database architectures and database management systems (DBMS) as are known in the art. The databases 218 may store the content associated with each user, consumer, purchaser, farm, ranch, and/or carbon removal service which, may specify an address, name, age, demographics, interests, family/friend information, biometric identifiers, payment information, permissions, settings, location, cause preferences, cause restrictions, and so forth. Any number of secure identifiers, such as inaudible tones, QR codes, serial numbers, or so forth may be utilized to ensure that content, personal, or transaction information is valid and is not improperly shared or accessed. The databases 218 may include all or portions of a digital ledger applicable to one or more block chain transactions including token generation, management, exchange, and monetization.

The user interface 205 may be made available through the various devices 201 of the system 200. In one embodiment, the user interface 205 represents a graphical user interface, audio interface, or other interface that may be utilized to manage data, transactions, and other information. For example, the user may enter, or update associated data utilizing the user interface 205 (e.g., browser or application on a mobile device). The user interface 205 may be presented based on execution of one or more applications, browsers, kernels, modules, scripts, operating systems, or specialized software that is executed by one of the respective devices 201. For example, the illustrative embodiments may utilize a carbon credit application that may be executed across multiple systems, platforms, devices, and/or instances.

The user interface 205 may display current and historical data as well as trends (e.g., trends in carbon utilization, environmental awareness, carbon removal effectiveness, personal carbon credit usage, etc.). The user interface 205 may be utilized to set the user preferences, parameters, and configurations of the devices 201 as well as upload and manage the data, content, and implementation preferences sent to the cloud system 214.

The user interface 205 may also be utilized to utilize and communicate the tokens 227 to the user and implement transactions. The devices 201 (e.g., displays, indicators/LEDs, speakers, vibration/tactile components, etc.) may present, play, display, or otherwise communicate the solicitations, offers, carbon credits 229 visually, audibly, tactilely, or any combination thereof.

In one embodiment, the system 200 or the cloud system 214 may also include the data platform 220 which is one or more devices utilized to enable, initiate, generate, aggregate, analyze, process, and manage data 226, tokens 227, carbon credits 229, transactions 228 and so forth with one or more communications or computing devices. The data platform 220 may include one or more devices networked to manage the cloud network and system 214. For example, the data platform 220 may include any number of servers, routers, switches, or advanced intelligent network devices. The data platform 220 may represent one or more web servers that perform the processes and methods herein described. The cloud system 214 may manage block chain management of the data 226 utilizing block chain technologies, such as tokens, digital ledgers, hash keys, instructions, and so forth.

In one embodiment, the logic engine 222 is the logic that controls various algorithms, programs, hardware, and software that interact to receive, aggregate, analyze, rank, process, score, communicate, and distribute data 226, tokens 227, carbon credits 229 content, transactions 228, alerts, reports, messages, or so forth. The logic engine 222 may utilize any number of thresholds, parameters, criteria, algorithms, instructions, or feedback to interact with users and interested parties and to perform other automated processes. In one embodiment, the logic engine 222 may represent a processor. The processor is circuitry or logic enabled to control execution of a program, application, operating system, macro, kernel, or other set of instructions. The processor may be one or more microprocessors, digital signal processors, application-specific integrated circuits (ASIC), central processing units, or other devices suitable for controlling an electronic device including one or more hardware and software elements, executing software, instructions, programs, and applications, converting and processing signals and information, and performing other related tasks. The processor may be a single chip or integrated with other computing or communications elements.

The memory 224 is a hardware component, device, or recording media configured to store data for subsequent retrieval or access at a later time. The memory 224 may be static or dynamic memory. The memory 224 may include a hard disk, random access memory, cache, removable media drive, mass storage, or configuration suitable as storage for data 226, transactions 228, instructions, and information. In one embodiment, the memory 224 and logic engine 222 may be integrated. The memory 224 may use any type of volatile or non-volatile storage techniques and mediums. In one embodiment, the memory 224 may store a digital ledger and tokens for implementing a blockchain system and processes for tracking, marketing, and selling carbon credits.

In one embodiment, the cloud system 214 or the data platform 220 may coordinate the methods and processes described herein as well as software synchronization, communication, and processes. The third-party resources 230 may represent any number of human or electronic resources utilized by the cloud system 214 including, but not limited to, businesses, entities, organizations, individuals, government databases, private databases, web servers, research services, and so forth. For example, the third-party resources 230 may represent regulatory and legal agencies, governments, carbon specialists, farmers, ranchers, airlines, shipping, marketers, companies, verification services, crypto mining operations, credit monitoring services, block chain services, payment providers/services, and others that pay for rights to use the data 226, tokens 227, and carbon credits 229 and track or provide information regarding the transactions 228.

In one embodiment, the data platform 220 may implement a blockchain system, platform, ledger, token manager, or blockchain technology. In another embodiment, the blockchain ledger may be accessible through sources 231. Any number of existing, developing, or future blockchain technologies, companies, or providers may be utilized (e.g., Aeternity, Ethereum, Bitcoin, Dfinity, ContentKid, Blockphase, Chain of Things, Flowchain, Decissio, Cognate, SkyHive, Safe, SALT Lending, Gemini, Circle, Coinbase, Chronicled, IBM, Voatz, Steem, Shipchain, etc.).

The blockchain is utilized as a way to store and communicate the data 226, tokens 227, carbon credits 229, and transactions 228. The blockchain may utilize one or more distinct ledgers for different entities, services providers, environments, types of emissions/pollution, carbon removal processes, types of data, users, or so forth. For example, each of the new carbon credits 229 received by the data platform 220 may be assigned one of the tokens 227 or other secure identifiers. In one embodiment, the tokens 227 may be managed utilizing a key that allows the user or controlling party to access the ledger. In one example, the tokens 227 and associated carbon credits 229 may be controlled by the user or control may be reassigned. The blockchain may cross-reference updates to the data 226 with the original record for the data platform 220 to ensure proper maintenance, validation, control, licensing, management, and transactions. In one example, different licensing tiers, removal processes, pricing algorithms, license verification, cause information, and payments are combined to create a unique platform. The illustrative embodiments provide a system 200, cloud system 214, and data platform 220 for using managing the carbon credits 229 utilizing the tokens 227.

The blockchain may also utilize any number of payment systems (e.g., proprietary, direct deposit, e-checks, PayPal, Venmo, Dwolla, Square, wire transfers, credit cards, Quicken, etc.) to receive money and distribute payments to the applicable party. In one embodiment, the data platform 220 may receive a small fee or percentage per transaction 228, token 227 utilized, data 226 uploaded/updated, data 226 purchased, shared, or licensed, purchased item, browsing session, or so forth. In one embodiment, the data platform 220 may be utilized to verify users and advertisers (as well as other users/entities that utilize the data platform 220) and associated data 226, tokens 227, carbon credits 229, and transactions 228 associated with the tokens 227.

The third-party resources 230 may represent any number of electronic or other resources that may be accessed to perform the processes herein described. For example, the third-party resources 230 may represent government, private, and non-profit servers, farms, databases, websites, programs, services, and so forth for verifying the data 226, tokens 227, transactions 228, and the carbon credits 229. In another example, auditors may verify the tokens 227 are actually generated based on the carbon credits 229 and data 226.

Various data and venue owners that access the data platform 220 may legally extract and tokenize the data 226, tokens 227, carbon credits 229, and transactions 228 for use in the exchange provided by the system 200 by identifying and tracking data utilizing automatic data extraction tools. Any number of privacy and data policies may be implemented to ensure that applicable local, State, Federal, and international laws, standards, and practices and procedures are met.

In one embodiment, a user or consumer group represented by a user of the devices 201 or the sources 231 may elect and receive permission to collect observational data. geolocation, field observations, optical recognition, and GPS data, collected from secure and authorized systems to achieve access to partial or complete data from the sources 231 (e.g., manufacturing data, human resources, vehicle records, commerce, waste stream data, farming process and techniques etc.).

The logic engine 222 may also perform valuation of the data 226 and advertisements as is taught by U.S. provisional patent application 62/755,815 entitled "Method and System for Data Valuation and Secure Commercial Monetization Platform" and filed Nov. 5, 2018 and corresponding PCT/US19/59920 filed Nov. 5, 2019 and as is taught by U.S. provisional patent application 62/826,457 entitled "Method and System for Data Futures Platform" filed Mar. 29, 2019 and corresponding PCT/US20/25495 filed Mar. 27, 2020 which are hereby incorporated by reference in their entirety. Various authorization, auditing, and validation processes may be performed by auditing groups, commissions, industry groups, or other professionals/entities. The various embodiments may also allow a user to donate the value of their data 226, tokens 227, carbon credits 229, and transactions 228.

In one embodiment, the logic engine 222 may utilize artificial intelligence. The artificial intelligence may be utilized to enhance data 226, tokens 227, carbon credits 229, and analyze transactions 228 to increase value, utilization, effectiveness, and profits. For example, artificial intelligence may be utilized to review, authenticate, and validate data 226 and transactions 228 that are received by the system 200. The artificial intelligence of the logic engine 222 may be utilized to ensure that the data 226 is improved, accurately analyzed, and value increased. For example, it is expected that data 226 and the associated tokens 227 that are associated with carbon credits 229 utilizing artificial intelligence.

In another embodiment, the devices 201 may include any number of sensors, appliances, and devices that utilize real time measurements and data collection to update the data 226. For example, a sensor network, wearables (e.g., watches, bands, implantable devices, etc.) and Internet of things (IOT) devices may gather user and behavioral data. The data platform 220 may also work in conjunction with hands-free data mining and measurement tools that tracks location, activity, and video-based data (e.g., from GPS location, video from farms and ranch's, beacon detection, proximity alerts, etc.) from any number of third-party sources. The user may be tracked through any number of environments, locations, and conditions based on permissions and settings.

Figure 3:
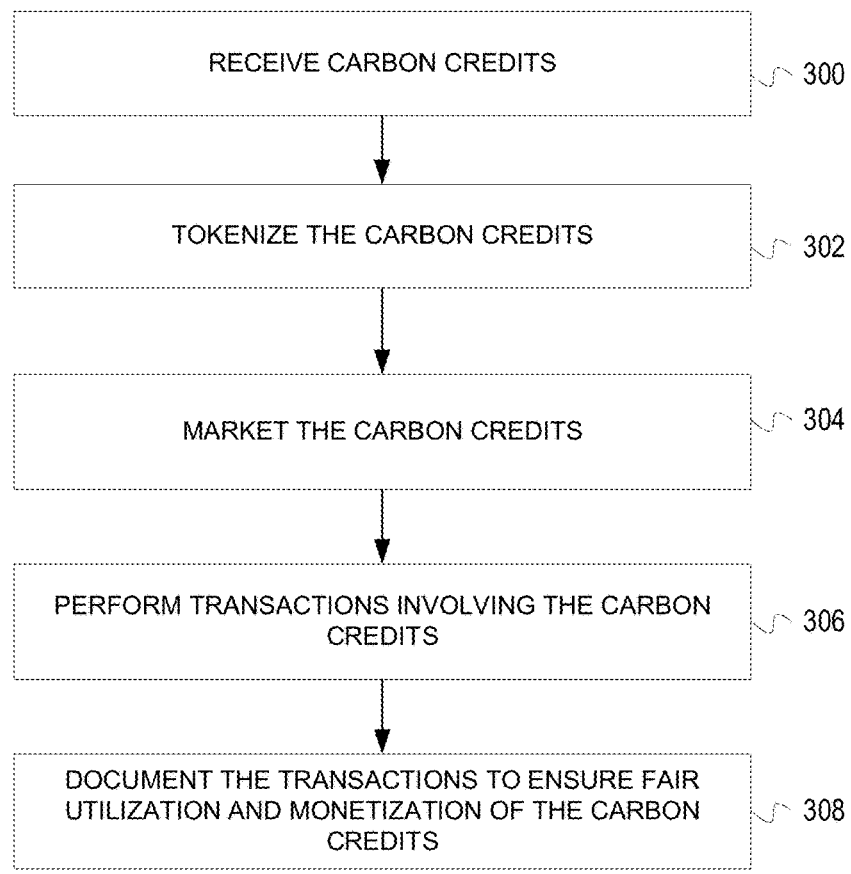
FIG. 3 is a flowchart of a process for processing carbon credits in accordance with an illustrative embodiment.

FIG. 3 is a flowchart of a process for processing carbon credits in accordance with an illustrative embodiment. The process of FIGS. 3-7 may be performed automatically or semi-automatically by algorithms, programs, or instructions. Any number of preparatory steps may be performed as part of the processes of FIGS. 3-7. For example, a user profile may be created for a user. The user profile may be generated or determined from already available information for the user. For example, the user profile may represent one or more profiles compiled by devices, accounts, services, or so forth. The user may provide answers utilizing one or more surveys, fields, questions, or other applicable information and data to determine applicable information and data.

The process of FIGS. 3-7 may be performed by a platform, device, server, or other equipment in accordance with illustrative embodiments (see for example the devices, servers, systems, and equipment of FIG. 1). All or portions of the steps or processes of FIGS. 3-7 may be performed automatically. The process of FIG. 3 may be implemented by a system or platform, such as the system 100, data platform 120, or devices 101 of FIG. 1 referred to generically herein as the platform. The steps of FIGS. 3-7 as well as the systems, devices, and components of FIGS. 1, 2, and 8 may be combined in any order, integrated, or otherwise combined as useful.

In one embodiment, the process of FIG. 3 may be implemented by a trading platform (e.g., data platform). Carbon credits are used a system and method to reduce the emission of greenhouse gases to limit global climate change. In one embodiment, a carbon credit is a permit or allotment that allows the company that holds the carbon credit to emit a certain amount of carbon dioxide or other greenhouse gases (GHGs). A carbon offset credit is a transferrable instrument certified by governments or independent certification bodies, with a standard carbon credit permit representing 1 ton of carbon dioxide removed from the atmosphere. Different credits may be associated with different amounts of carbon dioxide. In many cases, companies with an excess of carbon credits that do not need all of their credits for that year may sell the credits to other companies that may need additional credits to offset their own excess carbon production. Any number of existing cryptocurrency coins or tokens may be utilized. In another example, a new cryptocurrency coin may be utilized.

The carbon credits may be utilized by owners, purchasers, traders, and other parties that may represent large companies, governments, farmers, landowners, airlines, freight haulers, crypto mining operations, at-risk nations (e.g., island nations), and others. The carbon credits are associated with tokens to validate authenticity, verification, need, conservation/carbon offset efforts, document the process, and perform effective management. The carbon credits may be associated with coins, tokens, or transactions utilizing a smart contract. The carbon credits may also be associated with specific locations (e.g., GPS coordinates, latitude/longitude, interactive maps, legal title for properties, acreage, etc.) for the generation of carbon credits, protection of the land, advanced utilization, or other purposes. For example, the process of FIG. 3 may be utilized to verify and ensure that specific tracts of land associated with a carbon credit are utilized to remove more carbon from the air than was produced by the purchasing party.

The illustrative embodiments also facilitate the connection of companies, farms, and organizations who have an excess of carbon credits with companies who have exceeded their carbon production/utilization limits by allowing the companies to purchase additional credits to maintain compliance and good standing. For example, Bitcoin or cryptocurrency miners, server farms, or other groups/individuals may purchase carbon credits to mitigate their carbon footprint for automobiles, aircraft, computers/servers, factories, to create environmentally neutral, green, or carbon-reduced footprints. The illustrative embodiments may be run as an industry group, cooperative, collaborative group, or private entity in order to promote carbon credits outside of the political influence and uncertainty of governments, politics, and politicians.

The process may begin by receiving carbon credits (step 300). The carbon credits are allocated to applicable companies. The allotment of carbon credits may vary based on the type of company, output, number of employees, critical nature of the company (e.g., healthcare, mining, airlines, energy production, manufacturing, etc.). In one embodiment, the carbon credits may be ascribed an identifier (e.g., numerical value, hash, verification code, etc.) as each coin is minted/generated providing a novel electronic method to draw on the carbon credits and accurately track the coins and associated credits. In another embodiment, different users, parties, or companies may receive carbon credits based on carbon sequestration performed. Carbon may be sequestered by performed utilizing any number of systems, methods, or devices (e.g., sequestering it in its natural sinks such as forests, grasslands and soil. photosynthesis, artificial sequestration, geological sequestration, biological sequestration, direct air capture, etc.). For example, greenhouse gases may be captured from industrial facilities, power plants, dairies, ranches and/or other facilities and then injected underground and safely stored in deep, porous rock formations or may be used for captured, enhanced oil recovery, or other processes. Carbon credits may also be generated by protection or use/non-use of land (e.g., not deforesting the Amazon rain forest, planting carbon capturing crops/trees/plants, etc.) and other proactive or passive steps. Specific locations, coordinates, properties, acreage, forests, parcels, or regions may be tied with one or more of the carbon credits. The process may allow companies or farmers with an excess supply of banked carbon credits to tokenize carbon credits for trade or sale on the tokenized asset marketplace.

Next, the platform tokenizes the carbon credits (step 302). In one embodiment, the carbon credits may be associated with coins or tokens. During step 1902, tokens may be generated/minted to include the carbon credits and associated information. The coins require associated carbon credits to be associated with them. As a result, all coins are backed by an associated amount of carbon credits (e.g., 1 MT, ton, etc.). In one embodiment, a numerical value may be assigned to each block of credits. As a result, the platform may draw down and account for all credits, their sale, and utilization.

Next, the platform markets the carbon credits (step 304). Entities with surplus carbon credits may market the associated coins or tokens utilizing the platform. The needs of different entities allow for the carbon credits to be exchanged with the money involved utilized to support environmental efforts and offset the effects of emitting carbon dioxide or other greenhouse gases, undesirable materials, or potential pollutants.

Next, the platform performs transactions involving the carbon credits (step 306). In one embodiment, each time a carbon credit is utilized, the associated coin may be converted or tokenized as a non-fungible token or alternative type of coin (e.g., designated for utilized carbon credits). The record of the utilization includes all applicable information including creation date, carbon credit, transactions entities, transactions dates, utilization/retirement date, emission data, data for the company/entity utilizing the carbon credit, offset information, and so forth. Transactions may also involve partial tokens or micro fraction tokens to allow smaller companies to participate in the process. As a result, partial carbon credits associated with partial coins may be tracked, managed, transacted, and utilized.

Next, the platform documents the transactions to ensure fair utilization and monetization of the carbon credits (step 308). The transactions may be recorded in a digital ledger (e.g., multiple digital ledgers) for open and transparent review. For example, the ledger may track each instance the coin associated with the carbon credit is traded on the secondary market. All retired carbon credits associated with a token or coin may be indexed for reference. Used carbon credits may be drawn down from an overall, national, regional, or local account, count and/or tracking system. The blockchain system implemented by the platform provides an immutable ledger for tracking each unique record of carbon retirement. For example, retired credits may be indexed and tokenized as an NFT. The ledger may track each instance the applicable coins are traded on the primary or secondary markets as the assets are held, traded, or monetized. In one example, certified carbon credits may be valued at $8 per metric ton (MT) with pre-certified credits valued at $4 per MT. All tokens or cryptocurrency coins may be backed by certified or pre-certified credits. Each coin may be backed either by 12 MT of certified credits or 24 MT of pre-certified credits. Credits that are bought pre-certified typically have a lower initial cost providing a cost benefit when purchased as pre-credits. There may be a combination of certified and pre-certified credits backing each coin at a ratio of 2 to 1 (pre-certified to certified). The credits collateralizing each coin may be uniquely identified by an authorized group or party, such as GEC Communities, Inc. for the contract, concession, and time period of creation.

Each coin holder may have the ability to sell the underlying credits from the asset holding vehicle (e.g., coin, token, etc.) at a fixed costs per metric ton. The sales may be performed by authorized parties. The trading platform may impose limitations regarding the number of times that the coins may be traded per year or other time period. In one embodiment, if the credits are sold for a price greater than a predetermined amount or threshold (e.g., $6.40 net cost), the additional proceeds will belong to the coin holders. When credits are solid from the coin reserve, an entity, group, or conservator (e.g., GECC) may be paid 80% of the price ($8.00×0.80=$6.40 and the balance of the fund will stay in the coin holding vehicle for distribution. The managing entity may immediately replenish the coin with the number of credits that have been sold to ensure that the coin(s) are always properly collateralized.

One embodiment provides improved group funded or crowdsourced carbon reduction programs through the ability to provide carbon credit tokenization to groups of users through a mini token, which pays a dividend when a big token containing each investor or company taking part in a carbon reduction program is monetized. The big token is redeemed, and each mini-token holder is paid a dividend for each mini token held in the sale of a big token. In on embodiment, this application is called C to the 3rd power, which pays a Carb Credit Consumption Dividend, from a big token which is paid to all holders of a small token position.

In one embodiment, the difference per ton between the sales price and the threshold (e.g., $1.60 per metric ton—$8–$6.40) may be distributed to the coin holders with any administrative costs/fees subtracted from the total each time the sale occurs. For example, the funds may be utilized to cover overhead for managing the platform/exchange (e.g., approximately $0.24 per MT of the $1.60) with net proceeds (e.g., $1.36 per MT) distributed to the coin holders, such as the coin holder that sells the coins. Once the seller has been compensated for all credits that are collateralizing the coin(s) the balance may be distributed on a Pari Passu basis (i.e., equally without preference) across the coin holder base. The coin holder that sells the underlying carbon credits is paid first in the payment distribution for the sale. If a coin holder sells a volume of carbon credits greater than his underlying collateral the holder is effectively selling the credits backing other coins. Each individual coin holder has the right to "reserve" the carbon credits backing their coin(s) which are effectively removed from the total pool of carbon credits available to be sold or utilized. The act of reserving the credits may eliminate the possible duplicate sale of the credits from the pool. For example, a managing party or entity (e.g., GECC) may ensure that the carbon credits are properly allocated, associated with coins/tokens, associated with a verifiable GPS location, and added/removed from the applicable pool. In one embodiment, when credits are sold, a token or coin may be generated permanently identifying those credits that have been retired and may clearly identify the related carbon signature that the credits are offsetting. All records associated with the carbon credit cryptocurrency management will be securely recorded and stored in the platform in conjunction with the books and records of the tracking organizations to ensure transparency, removal type effectiveness, environmental protection, and best practices.

Figure 4:
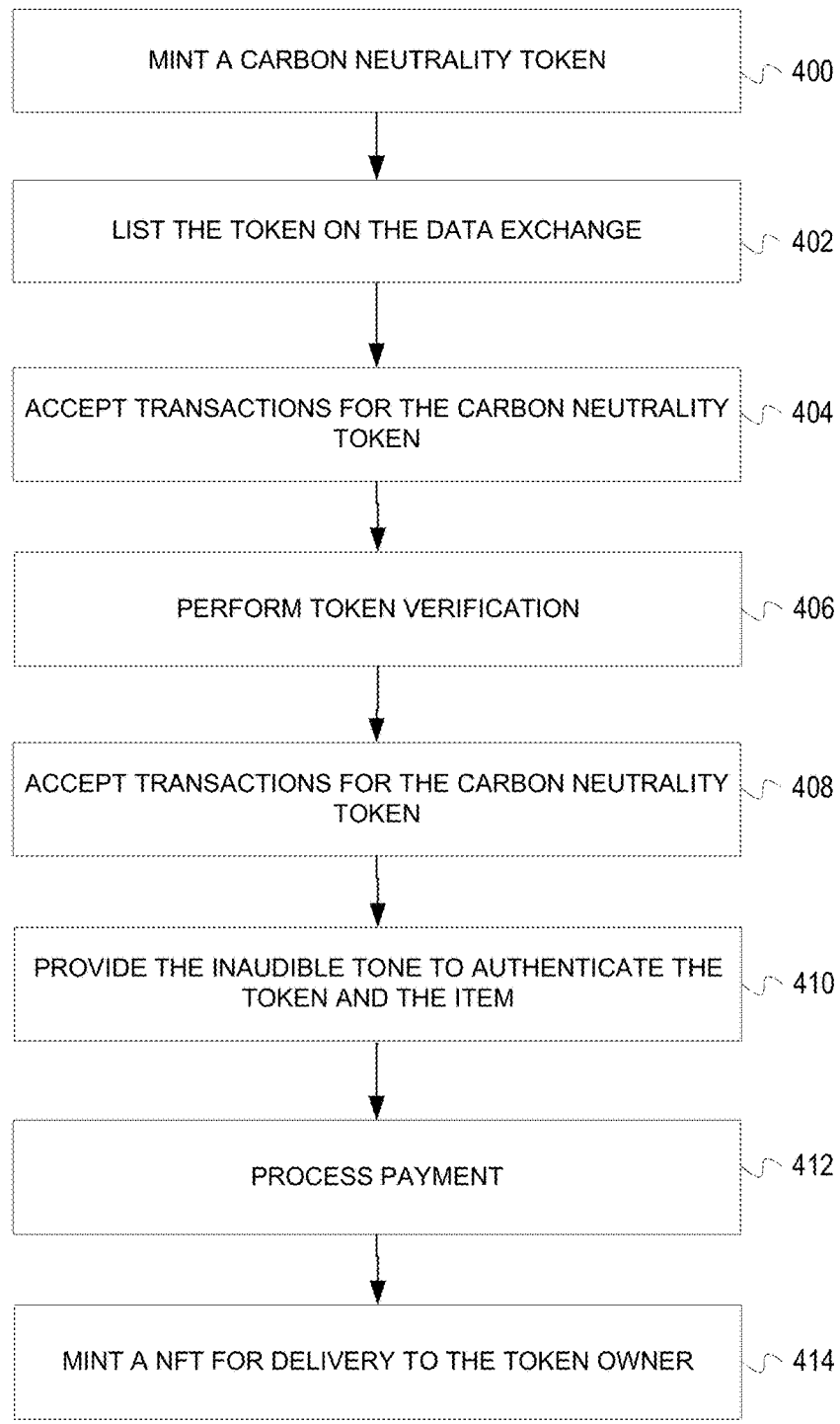
FIG. 4 is a flowchart of a process for processing tokens in accordance with an illustrative embodiment.

FIG. 4 is a flowchart of a process for processing tokens in accordance with an illustrative embodiment. In one embodiment, the process of FIG. 4 may be managed by a service provider. The process may begin by minting a carbon credit token (step 400). The carbon credit may be a token that is utilized by businesses, organizations, individuals, families, and others to support carbon neutrality efforts. The carbon credit token may be associated with one or more carbon credits. The carbon credit tokens may be associated with one or numerous carbon credits. The carbon credit tokens may have data and information associated with the carbon credit tokens, such as minting party, associated carbon credits, initial owner, environmental area protected, property owners, term/expiration period, or other applicable information.

Next, the system lists the token on the data exchange (step 402). The tokens may also be listed on a carbon credit marketplace. The data exchange may be operated by the service provider. The token may be listed for sale, trade, barter, or other transaction on the data exchange. The data exchange may be accessible by any number of users, devices, systems, platforms, and so forth. In one embodiment, the token may be listed on numerous exchanges to maximize the value of the tokens.

Next, the system accepts transactions for the carbon neutrality tokens (step 404). The transactions may include any number of payments, compensation, trade, or barter. The payments may include traditional payments (e.g., credit cards, direct deposit, etc.), payment services (e.g., PayPal, Venmo, Square, etc.), blockchain/cryptocurrency payments, and so forth.

Next, the system performs token verifications (step 406). The tokens may be verified to ensure authenticity of land location and removal effectiveness. Token verification may be performed utilizing any number of blockchain processes. A secure identifier associated with the tokens may also be utilized to perform verification. The information and data associated with the token may be utilized to perform authentication. In one embodiment, the tokens may be verified by a community partner, such as GECC, a service provider associated with the tokens, or others.

Next, the system accepts transactions for the carbon neutrality tokens (step 408). In one embodiment, transactions may only be performed if verified in step 406. The transactions may include sales, trades, retiring/exchanges/utilization of the associated carbon credits, and so forth. The transactions may be performed utilizing the exchange managed by the system. During transactions, the applicable parties (e.g., owner, holder, farm, distributor, negotiator, escrow, etc.) are compensated for their ownership rights or other rights associated with the tokens.

Next, the system provides the inaudible tone to authenticate the token and the item (step 410). In other embodiments, an inaudible tone may not be required, but rather secure identifying information within or associated with the token may be utilized.

Next, the system processes payment (step 412). The payment may be processed by the service provider, a clearinghouse, or other interested party. As noted, any number of parties may be associated with the transaction. As a result, payments may be implemented to various users.

Next, the system mints a NFT for delivery to the token owner (step 414). The NFT may be minted representing the token and associated carbon credits. For example, the carbon credits associated with the tokens may have been utilized. The NFT may have the resource, land, GPS coordinates, or other carbon neutrality efforts associated with the carbon credits integrated as part of the NFT. The service provider may be the repository and manage of carbon credits that are held in inventory to be collateralized by associated tokens.

Figure 5:
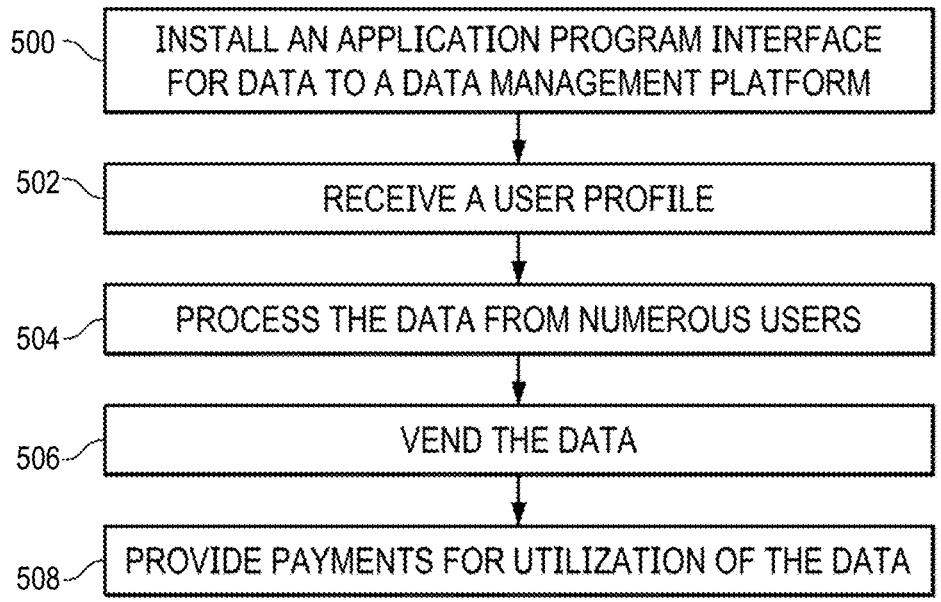
FIG. 5 is a flowchart of a process for monetizing data in accordance with an illustrative embodiment.

FIG. 5 is a flowchart of a process for monetizing data in accordance with an illustrative embodiment. The process of FIG. 5 may begin by installing an application program interface for data to a data management platform (step 500). The data management platform may be utilized to manage and utilize carbon credits and tokens. The application program interface (API) may be installed or integrated with any number of platforms, programs, or so forth. The API may also be any number of software programs, scripts, modules, sets of instructions, or so forth. In one embodiment, the API is integrated with a web browser as an add-in, extension, or other interface. For example, the API may be integrated with a search tool (e.g., standalone, browser-based, network managed, etc.). The API may be utilized by individuals, corporations, data exchange companies to enhance their data protection and data management and monetization strategy. The illustrative embodiments are an improvement over existing carbon credit monitoring technologies because they provide user control and validity of the carbon credit marketing and sales process that additionally protects personal and online data for the purpose of monetization by the token owners.

Next, the system receives a user profile (step 502). The user profile may represent a business, individual, family, farm, group of individuals (e.g., friends, clubs, associates, etc.), company, organization, or entity and may be referred to generally as a "user profile" or "data profile." For example, a user profile may be created for a user regarding carbon usage/consumption, emissions, environmental preferences, historical/predicted usage, and so forth. The user profile may be utilized to purchase tokens, suggest tokens or credits, or otherwise perform the processes herein described. The user profile may also include user preferences, settings, parameters, and other applicable information that control what, when, and how data related to the carbon removal process may be collected, shared, and monetized. The user profile may be generated or determined from already available information for the user. For example, the user profile may represent one or more profiles compiled by devices, accounts, services, or so forth. The user may provide additional answers, photos, video, utilizing one or more surveys, fields, questions, or other applicable information and data to determine applicable information and data.

Next, the system processes the data from numerous users (step 504). The data may be processed by adding, confirming, modifying, reconfirming, and authorizing data according to the user profile. In one embodiment, raw data may be converted into data objects. For example, user purchases may be created to specify that the user has multiple businesses that perform both manufacturing and distribution. The illustrative embodiments may utilize artificial intelligence or machine learning to perform processing and segmentation of the data during the data collection process. The data may be raw, partially processed, structured, or unstructured as utilized and monetized. The data herein described may be transformed from raw data into data objects, sets, and profiles tied to real world and digital assets.

In one embodiment, during step 504, the data may be associated with a unique security token that points to or includes the data. The data may include new, added, modified, or updated user data or profile objects, such as consumer interest, sharing of personal plans, likes and dislikes, opinions, social media feeds, photos, video, purchases, preferred retailers, products and services of interest, and other similar information.

Next, the system vends the data (step 506). Carbon credit tokens or separate tokens may grant access to the data. Full or partial tokens may be included in transactions. The tokens may be involved in transactions by conservation groups, governments, manufacturers, advertisers, brands, corporations, and any entity who values or requires access to data to enhance utilization of tokens associated with carbon credits. Tokens may be passed from these parties to consumers/users in exchange for access to their data. The tokens may be distributed each time a user associated with a data object participates in sharing, updating, exchanging, or selling the data. The illustrative embodiments provide the ability to band multiple variable priced micro fractions of tokens for each single or new data point/object. The platform may also band a single higher value token to represent and monetize a large exchange of data (e.g., objects, sets, profiles, pool(s), etc.).

Next, the system provides payment for utilization of the data (step 508). The system may track the fluctuating value of the carbon credits, data points, sets, and pools (all referred to as "data"). The system may ensure that users receive optimal compensation and monetization of their data. User may be paid in hard currency (e.g., American Dollars, British Pounds, Mexican Pesos, etc.), digital currency, cryptocurrency, discounts, services, rebates, or so forth. The purchasers of the tokens/and associated data may offer users micro fractions of a tokens market value in exchange for access to advertiser desired data profile elements. The described systems and methods allow data to be monetized even if not fully utilized by the user (e.g., company, individual, entity, etc.). As a result, the user may be able to create new or enhanced revenue streams from latent data that may be collected as a byproduct of their business. The illustrative embodiments may provide a method of utilizing data that satisfies user, legal/privacy, and industry standards as well as securing the data against unwanted access or intrusions.

Figure 6:
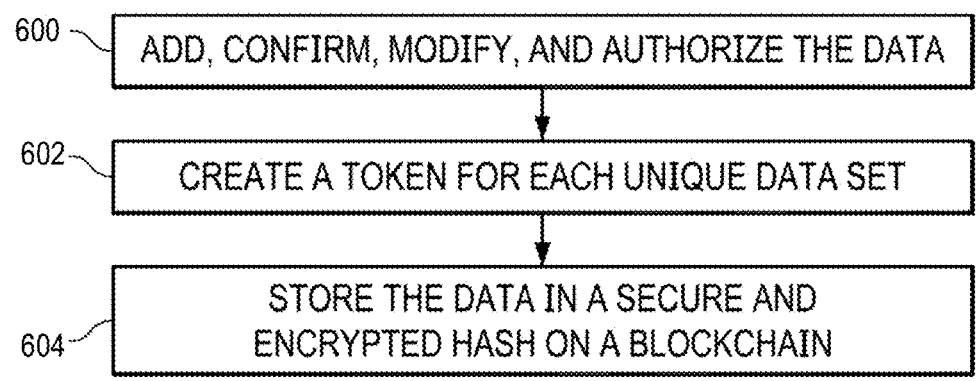
FIG. 6 is a flowchart of a process for storing data in accordance with an illustrative embodiment.

FIG. 6 is a flowchart of a process for storing data in accordance with an illustrative embodiment. The process of FIG. 6 may begin by adding, confirming, modifying, and authorizing the data (step 600). At any time, different data objects may be added. The data may be added as individual elements, sets, profiles, and pools. The platform may be added, confirmed, modified, and authorized as structured or unstructured data.

Next, the system creates a token for each unique data set (step 602). The tokens may point to a single data object/element, data sets, data profiles, or data pools. The tokens may include carbon credits. The illustrative embodiments allow for the tokenization of a real-world or digital assets, such as carbon credits for the purpose of implementing micro-fraction ownership of the corresponding asset. The tokens may then be involved in any number of transactions involving numerous parties.

Next, the system stores the data in a secure and encrypted hash on a block chain (step 604). In one embodiment, an encrypted hash on the blockchain may be utilized to store the data (e.g., data objects, data sets, data pools, etc.). Although reference is made to utilizing a block chain system, the illustrative embodiments may also utilize other secure storage techniques, such as encrypted databases, secured servers, and so forth.

Figure 7:
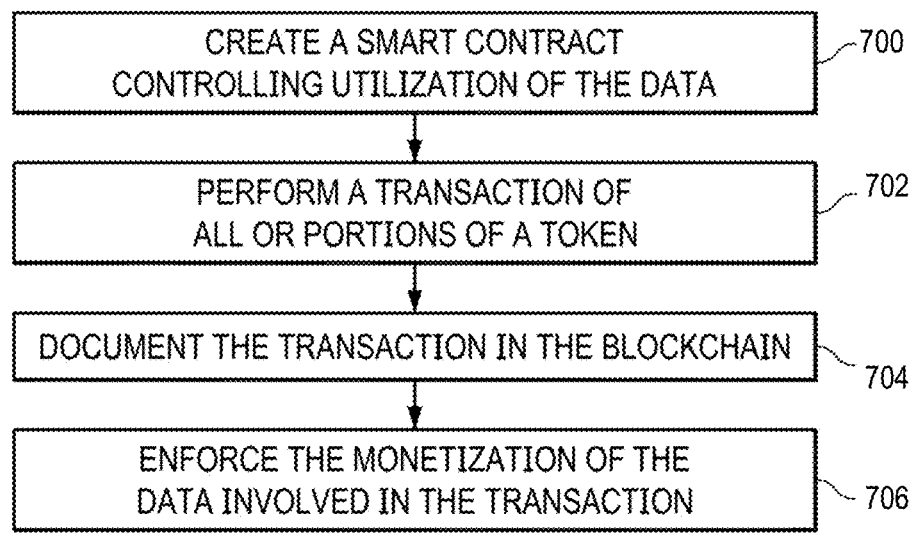
FIG. 7 is a pictorial representation of a platform for monetizing data in accordance with an illustrative embodiment.

FIG. 7 is a flowchart of a process for monetizing data in accordance with an illustrative embodiment. The process of FIG. 7 may begin by creating a smart contract controlling utilization of the data (step 700). The smart contract may be created based on the requirements of the user and potential purchasers (e.g., advertisers, corporations, etc.). The smart contract governs how the user is compensated for transactions involving the data and/or carbon credits. The smart contract may also specify the rights granted to a token holder. The legal rights, permissions, binding terms, and other information may be specified by the smart contract. In one embodiment, the smart contract controls how the data and/or carbon credits are utilized and monetized. The price of the data may be governed by free market valuations or within a carbon credit marketplace. Alternatively, the smart contract may set price maximums and minimums. In one embodiment, the smart contract may allow for the geographic utilization of the data and geographic proof of carbon offset measures. For example, the data may be of value for location-based targeting to interested parties (e.g., farms, neighborhood, region, city, state, etc.).

Next, the system performs a transaction of all or portions of a token (step 702). The platform may include or represent an exchange. As noted, full tokens or partial tokens of any size may be involved in transactions. For example, fractional or micro share of the tokens may be involved in the transactions. The purchase or exchange of tokens may provide a party access to the data associated with the token. Transactions may be performed through the system that measures and values the tokens, data, and other transaction components in real-time. The transaction may include any number of markets, limit, stop, short, option, or futures transactions or orders. For example, the transaction may be performed based on a price that is predetermined or determined in real-time or determined at the time of transaction of the data from the seller to purchaser.

Next, the system documents the transaction in the block chain (step 704). In one embodiment, the transaction may be recorded on the ledger associated with the block chain. The transaction may also be recorded utilizing any number of databases or so forth.

Next, the system enforces the monetization of the data involved in the transaction (step 706). In one embodiment, the monetization of the data and associated transaction involved in the transaction may be governed by the smart contract. The system may ensure that carbon credits are effectively verified, utilized, and converted as needed.

The illustrative embodiments also provide a platform for users to securely store their data in a data value that obscures unwanted access to their data. For example, the identifying information for the user may be disassociated from their data and profile. As a result, user profiles and carbon offset data may be more freely shared with approved advertisers, brands, marketers, and others and lessens the need for those parties to focus revenue on blind and behavioral targeting that historically has exceptionally low conversion rates.

In the illustrative embodiments, token purchases and payouts may be documented in smart contracts and stored on the blockchain. The smart contracts may be executed by users and parties (e.g., advertisers, marketers, analysts, researchers, etc.) who trade access to the data for a full or partial share of the token. Tokens may be exchanged between parties based on needs and desires. The data may be valued based on how often it is updated, modified, verified, and based on overall completeness.

Figure 8:
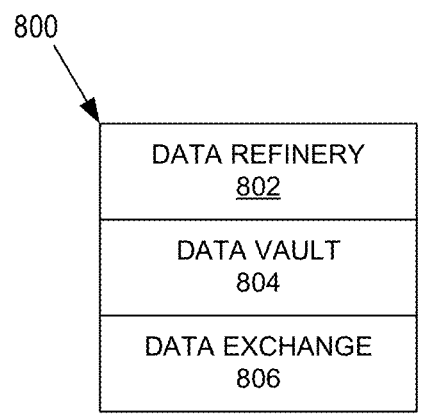
FIG. 8 is a pictorial representation of a platform for monetizing data and tokens in accordance with an illustrative embodiment.

FIG. 8 is a pictorial representation of a platform 800 for monetizing data and tokens in accordance with an illustrative embodiment. The platform 800 may include a data refinery 802, a data vault 804, and a data exchange 806. The platform 800 of FIG. 8 may be representative of one or more devices, such as the servers 116, data platform of FIG. 1, or other smart networked device implementing specific hardware, software, firmware, and/or sets of instructions. The platform 800 including the data refinery 802, data vault 804, and the data exchange 806 may function as separate platforms or an integrated platform.

The data refinery 802 provides a secure cloud management infrastructure that takes in data from multiple sources and restructures the data into standardized data objects ready to be monetized. The data refinery 802 is utilized to create tokens, data objects, and capture applicable data to include the data objects. In one embodiment, the data refinery 802 may be positioned within the user's existing system to capture data that is already received, entered, gleaned, or otherwise determined by the existing system. The data object may be created to store all, portions, or types of data associated with the user (e.g., individual, couple, family, farm, company, organization, group, entity, etc.). The data refinery 802 may create tokens as described that are associated with one or more carbon credits.

The data vault 804 provides highly secure and encrypted index management system with an interface for creating, managing, and publishing data objects to the data exchange 806. The data vault 804 is utilized to securely store the tokens, data objects and add, modify, and improve the associated data tokens. In one embodiment, the data vault may be utilized to collect, characterize, and value the data. The data vault 804 may also determine the pace at which new tokens, and/or data objects are added or updated as well as the types of tokens and data. For example, the data vault 804 may determine that information relevant to two of the user's clients including carbon emissions and environmental protection are added to the data vault 804 each day. The data vault 804 may be a physical or virtual storage and vault that securely stores information. In one embodiment, the data objects may be deidentified to remove identifying information to prevent hacking, identity theft, and other unwanted or prohibited utilization of data. The data vault 804 may also assign an initial value for the data object. The value may be associated with similar data, going rates, completeness of the data, the type of data, the user supplying the data, historical information, and so forth. The value may change at any time based on a determination of the platform 804 (i.e., the data vault or data exchange).

The data exchange 806 is a digital marketplace for data trading where registered buyers and sellers exchange money for listed data objects. The data exchange 806 is utilized to price and perform transactions for the tokens and/or data objects. In one embodiment, the data exchange 806 creates a ticker or secure identifier associated with the token or data object. The data exchange 806 allows the tokens and/or data objects to be priced and purchased. In one embodiment, the exchange may utilize secure tokens to access the data. For example, transactions involving the data may represent a key for accessing the purchased or leased data. For example, the tokens may include an encryption key, password, biometric, or other secure identifier for accessing the data object from the data vault or other stored location.

The platform 800 may perform data reconciliation of the information at any time during the process. In one embodiment, a data reconciliation engine may review the applicable information to determine tokens, NFTs, or products/services that align with the data and interests of the user. In one embodiment, the platform 800 may determine a portfolio of potential tokens associated with the user's data or interests. As a result, the displays, available purchases, advertisements, prompts, outreach, services, rewards, and so forth may be readily available in real-time or near real-time.

The illustrative embodiments allow blocks of user data, vending data, transaction data, and other data and information described herein to be stored across a blockchain system, platform, or network. There is no single point of control or failure. User's data is secured so that access and utilization results in compensation directly or indirectly to the user in a way that has not happened before. The user, service providers, sellers, intermediaries, exchanges, platforms, managers, and/or other parties or devices may perform create, read, update, and delete operations on the data with an audit trail of the user data and utilization being tracked. As a result, validation and reconciliation of all portions of the process may be performed effectively.

Figure 9:
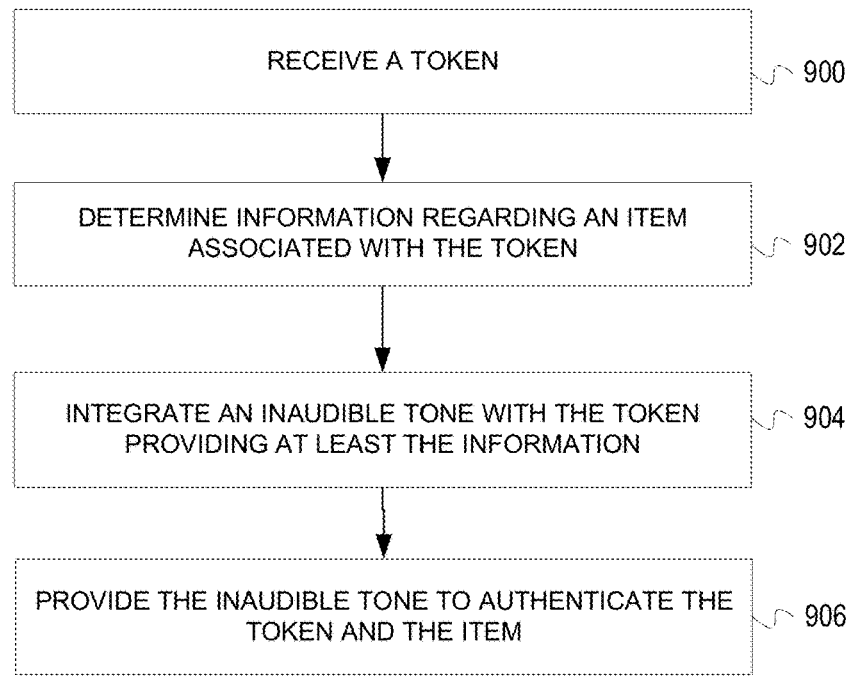
FIG. 9 is a flowchart of a process for authenticating and validating a token utilizing an inaudible tone in accordance with an illustrative embodiment.

FIG. 9 is a flowchart of a process for authenticating and validating a token utilizing an inaudible tone in accordance with an illustrative embodiment. The process of FIG. 9 may be performed as tokens are created or as data, content, information, or items are tokenized as described herein. In another embodiment, tokens may be enhanced or revised after creation or at any time. The process may begin by receiving a token (step 900). As note, the tokens may represent any number of nonfungible tokens or tokens representing virtual or digital items or physical items and assets. The process may be performed utilizing any number of different blockchain tokens including a carbon credit token.

Next, the platform determines information regarding an item associated with the token (step 902). The item may represent a virtual item, digital item, file, physical asset (e.g., precious gem/metal/coin, artwork, vehicle, home, collectible, etc.), or other content. The information may be metadata or details regarding the item, such as year created, creator/artist/manufacturer, identifying information (e.g., serial number, make/model, etc.), previous owner(s), condition, escrow location/company, and other applicable information.

Next, the platform integrates an inaudible token with the token providing at least the information (step 904). The inaudible tone is one or more audio signals that are inaudible to humans. The inaudible tone may be utilized to communicate the information as well as additional details about the token, the item, available transactions, or other information.

Next, the platform provides the inaudible tone to authenticate the token and the item (step 906). For example, the inaudible tones may be utilized within a space to market the availability of the token and/or item for purchase, auction, licensing, or other applicable transactions. The inaudible tone may also be utilized to verify that the token is authentic. The information may include a certificate, Internet verification information, or other details for a potential party to verify and authenticate the token/item. The inaudible tones may also be utilized to verify any purchase, sale, license, or utilization of each unique token over time. In one embodiment, the platform or a physical item may be tagged or include an audio watermark with an inaudible tone transmitter in order to communicate the inaudible tones to one or more speakers, receivers, or personal computing devices, such as smart phones, tablets, wearable electronics, vehicles, or other electronic devices to validate and authenticate the token/item. The illustrative embodiments incorporate by reference U.S. Pat. Nos. 10,460,709, 11,030,983, 10,242, 518 along with the associated description and drawings.

Figure 10:
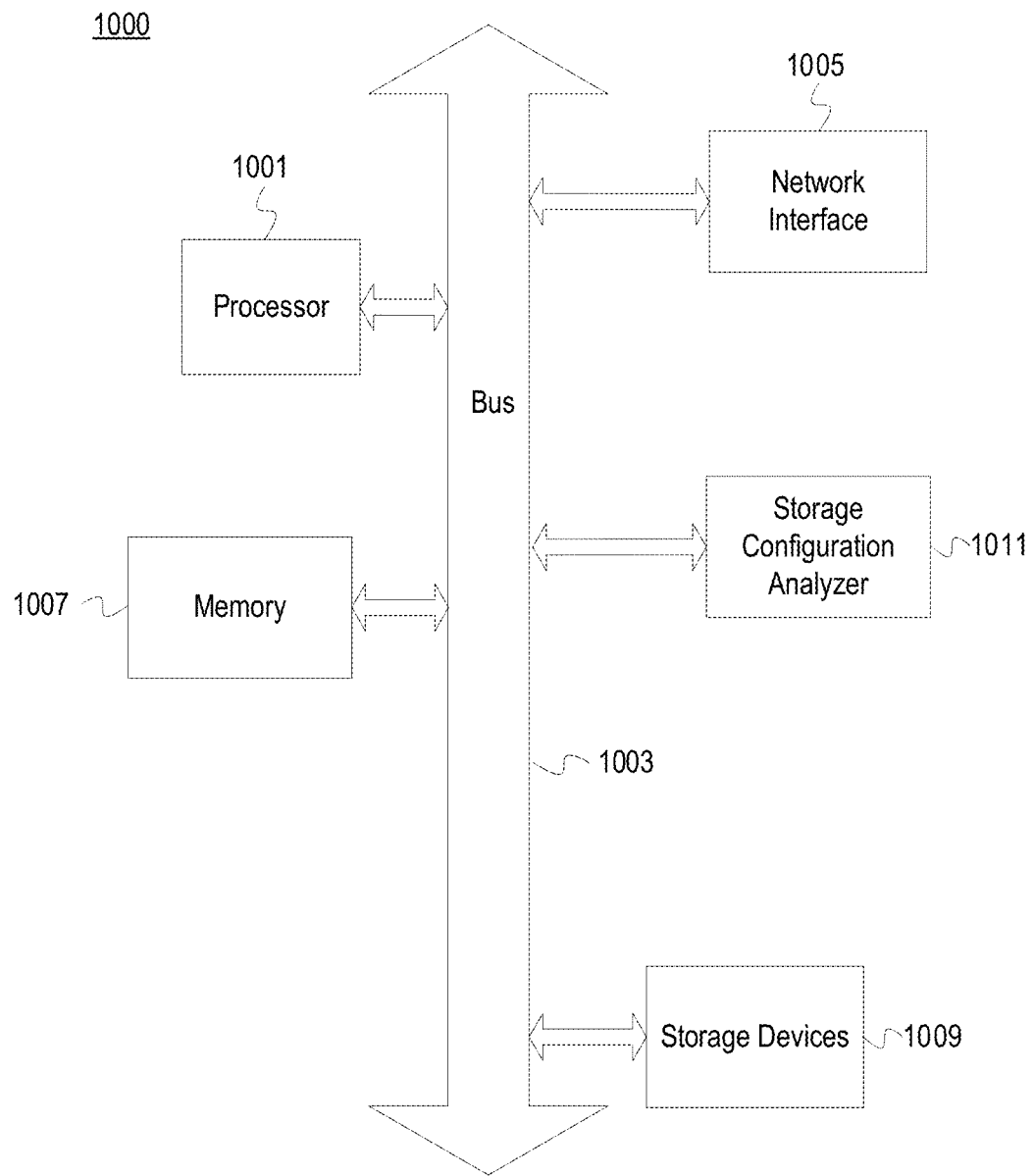
FIG. 10 depicts a computing system in accordance with an illustrative embodiment.

FIG. 10 depicts a computing system 1000 in accordance with an illustrative embodiment. For example, the computing system 1000 may represent a device, such as one or more of the devices 101 of FIG. 1. The computing system 1000 includes a processor unit 1001 (possibly including multiple processors, multiple cores, multiple nodes, and/or implementing multi-threading, etc.). The computing system includes a memory 1007. The memory 1007 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the above already described possible realizations of machine-readable media. The computing system also includes a bus 1003 (e.g., PCI, ISA, PCI-Express, HyperTransport®, InfiniBand®, NuBus, etc.), a network interface 1005 (e.g., an ATM interface, an Ethernet interface, a Frame Relay interface, SONET interface, wireless interface, etc.), and a storage device(s) 1009 (e.g., optical storage, magnetic storage, etc.). The system memory 1007 embodies functionality to implement embodiments described above. The system memory 1007 may include one or more functionalities that store content, blockchain data, parameters, application, user profiles, and so forth. Code may be implemented in any of the other devices of the computing system 1000. Any one of these functionalities may be partially (or entirely) implemented in hardware and/or on the processing unit 1001. For example, the functionality may be implemented with an application specific integrated circuit, in logic implemented in the processing unit 1001, in a co-processor on a peripheral device or card, etc. Further, realizations may include fewer or additional components not illustrated in FIG. 10 (e.g., video cards, audio cards, additional network interfaces, peripheral devices, etc.). The processor unit 1001, the storage device(s) 1009, and the network interface 1005 are coupled to the bus 1003. Although illustrated as being coupled to the bus 1003, the memory 1007 may be coupled to the processor unit 1001.

The illustrative embodiments provide a system, method, device, and platform that utilizes a blockchain based system for tokenizing and monetizing consumer data, corporate data, financial data, accounting data, personal data, family history, DNA tracking, human resources, art, real-world objects, virtual objects, metaverse assets, patents, trademarks, copyrights, ownership, collections, memorabilia, content, media, music, files, and video content. In one embodiment, data related to book collections, music collections, record collections, art collections, teaching lesson plans, music lessons, church sermons, prayers, and so forth may be objective and tokenized for the purpose of monetization or proof of ownership, authenticity, action, sharing, licensing, or for insurance documentation purposes.

The platform provides a data and asset monetization methodology that transforms data, real-world objects, and virtual objects into tokenized data objects through a process that refines and objectifies profile data, corporate data, and real-world assets for the purpose of token-based monetization. This blockchain based data documentation and monetization platform covers a variety of real-world object and specific cloud and Internet-based data collection, valuation, and monetization methodologies.

The illustrative embodiments provide a platform that offers consumers, corporations, brands, services providers, and data aggregators, a complete data protection and monetization solution. The various embodiments may be utilized to objectify, tokenize, and track the value of data via the block chain for the purpose of consumer and corporate data valuation and monetization.

The system, method, and platform may deidentify, document, objectify, tokenize, and provide enhanced user and corporate control over access to personal and corporate data. The platform may be utilized to mine data assets and is used across a wide range of consumer and corporate data pools. The data includes, but is not limited to core data, derivative data, data partnerships, data development, and provides data owners the ability to monetize any single data point or multiple data points, profile groups, or large sets of data or data profile pools.

The platform may be used to tokenize and monetize physical assets, such as real estate, property plant and equipment (PPE), capital, physical locations, mobile applications, accounts, contacts, data assets, corporate assets, inventories, art, collectibles, non-fungible tokens (NFT), signs, furniture, receivables, and so forth. The platform may also be utilized to tokenize and monetize intangible assets, such as patents, copyrights, trademarks, leases, logos, brand names, brand positioning, computer programs, digital content, files, customer lists, franchise agreements, supply chain agreements, corporate owned assets, non-fungible tokens, non-fungible token assets, domain names, trade secrets, and other non-tangible, or semi-tangible assets. Intangible assets often provide the core of a company's competitive advantage and mark position and are often the key driver of a business' success.

In the illustrative embodiments, the platform is linked to a user, corporate, corporate group (e.g., human resources, accounting, legal, research and development, business, management, etc.), organization, or other profile which may be secured and accessed via the platform. The profile may also be directly tied to the banking account associated with the profile for securely storing, documenting, tracking, and monetizing the value of the data. The platform may also pay a dividend (e.g., data, financial, etc.) through blockchain or through a consumer bank account based on the current market price of available tokenized data. The data may be more valuable if it is comprehensive, up-to-date, frequently updated, or so forth. The platform may incentivize users to update missing data elements to further increase the value of the data. For example, added data components may help create a more comprehensive data profile that helps advertisers, brands, corporations, and others improve advertising outcomes through increased advertising/marketing conversions, data utilization, and so forth.

The illustrative embodiments provide for enhanced refinement, valuation, and monetization of tokenized assets. The platform may be paired with the blockchain to connect consumers, brands, advertisers, retail, corporations, and other groups through real-world processes of aggregating, monetizing, and distributing data utilizing blockchain. Advertisers, services providers, and others may reach, access, and utilize consumer or corporate data more effectively. Decentralized smart contract-based data and asset monetization may improve results for individuals, companies, creators, licensors, distributors, and others.

The various embodiments may utilize a deidentification process to further maximize how different types of data may be utilized. Smart contracts and blockchain management may be utilized to effectively monetize the different types of assets. The platform may utilize artificial intelligence and machine learning to provide recommendations for aggregation, utilization, or monetization of a tokenized data profile.

The platform may utilize a virtual private network to further provide software, secure communications, analytics tools, widgets, programs, apps, or widgets to obscure or block access to specific user data points.

The features, steps, and components of the illustrative embodiments may be combined in any number of ways and are not limited specifically to those described. In particular, the illustrative embodiments contemplate numerous variations in the smart devices and communications described. The foregoing description has been presented for purposes of illustration and description. It is not intended to be an exhaustive list or limit any of the disclosure to the precise forms disclosed. It is contemplated that other alternatives or exemplary aspects are considered included in the disclosure. The description is merely examples of embodiments, processes, or methods of the invention. It is understood that any other modifications, substitutions, and/or additions may be made, which are within the intended spirit and scope of the disclosure. For the foregoing, it may be seen that the disclosure accomplishes at least all of the intended objectives.

The previous detailed description is of a small number of embodiments for implementing the invention and is not intended to be limiting in scope. The following claims set forth a number of the embodiments of the invention disclosed with greater particularity.

The illustrative embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments of the inventive subject matter may take the form of a computer program product embodied in any tangible or non-transitory medium of expression having computer usable program code embodied in the medium. The described embodiments may be provided as a computer program product, or software, that may include a machine-readable medium having stored thereon instructions, which may be used to program a computing system (or other electronic device(s)) to perform a process according to embodiments, whether presently described or not, since every conceivable variation is not enumerated herein. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions. In addition, embodiments may be embodied in an electrical, optical, acoustical, or other form of propagated signal (e.g., carrier waves, infrared signals, digital signals, etc.), or wireline, wireless, or other communications mediums.

Computer program code for carrying out operations of the embodiments may be written in any combination of one or more programming languages, including an object-oriented programming language such as Java, Smalltalk, C++, or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN), a personal area network (PAN), or a wide area network (WAN), or the connection may be made to an external computer (e.g., through the Internet using an Internet Service Provider).

What is claimed is:

1. A method for managing carbon credits utilizing tokens, comprising:
   receiving, by a data platform, carbon credits associated with a unit of carbon emissions;
   executing a smart contract on a blockchain network in communication with the data platform to manage utilization of the carbon credits;
   tokenizing, by the data platform, the carbon credits to create tokens associated with each of the carbon credits, wherein the tokens are blockchain tokens;
   marketing, via the block chain network, the carbon credits to authorized parties;
   verifying the authenticity of the tokens associated with the carbon credits prior to authorizing any transactions for the tokens;
   performing transactions for the tokens associated with the carbon credits in accordance with the smart contract utilizing the data platform; and
   documenting the transactions for the tokens in a distributed ledger associated with the data platform to ensure transparency and efficient utilization of the carbon credits.

2. The method of claim 1, further comprising:
   recording utilization of one of the carbon credits associated with one or more of the tokens as a retired credit associated with a non-fungible token.

3. The method of claim 1, further comprising:
   verifying that the authorized parties are allowed to utilize the carbon credits and perform transactions for the tokens.

4. The method of claim 1, wherein the tokens are marketed utilizing the blockchain network.

5. The method of claim 1, wherein the transactions are enabled to be performed utilizing currency and cryptocurrency.

6. The method of claim 1, further comprising:
generating the one or more tokens utilizing information associated with the carbon credits.

7. The method of claim 1, wherein the transactions are controlled utilizing the smart contract associated with the tokens and the carbon credits.

8. The method of claim 1, wherein marketing the carbon credits comprises:
providing an exchange for the carbon credits.

9. The method of claim 1, wherein the tokens associated with the carbon credits are partially usable or transactable, and wherein a plurality of parties own portions of one of the tokens.

10. The method of claim 1, wherein the carbon credits are associated with a physical location or environmental cause.

11. A system for tokenizing carbon credits, comprising:
a plurality of electronic devices executing a data application, the data application is configured to capture the user data associated with a user; and
a data platform accessible by the plurality of electronic devices through one or more networks and executing the data application, wherein the data platform receives carbon credits associated with a unit of carbon emissions, executes a smart contract on a blockchain network in communication with the data platform to manage utilization of the carbon credits, tokenizes the carbon credits to create tokens associated with each of the carbon credits, markets via the block chain network associated with the data platform the carbon credits to authorized parties, verifies the authenticity of the tokens prior to authorizing any transactions for the tokens, performs transactions for the tokens associated with the carbon credits in accordance with the smart contract, and documents the transactions for the tokens in a distributed ledger associated with the data platform to ensure transparency and efficient utilization of the carbon credits.

12. The system of claim 11, wherein the data platform records utilization of one of the carbon credits associated with one or more of the tokens as a retired credit associated with a non-fungible token.

13. The system of claim 11, wherein the data platform verifies that the authorized parties are allowed to utilize the carbon credits and perform transactions for the token.

14. The system of claim 11, wherein the tokens associated with the carbon credits are partially usable or transactable, and wherein a plurality of parties own portions of one of the tokens.

15. The system of claim 11, further comprising:
a carbon sequestration system capturing green house gases supported by one or more parties, wherein the parties are compensated for carbon sequestration by being granted tokens.

16. A data platform, comprising:
a processor for executing a set of instructions;
a memory for storing the set of instructions, wherein the set of instructions are executed to:
receive carbon credits associated with a unit of carbon emissions;
execute a smart contract on a blockchain network in communication with the data platform to manage utilization of the carbon credits;
tokenize the carbon credits to create tokens associated with each of the carbon credits, wherein the tokens are cryptographic tokens;
market, via the block chain network, the carbon credits to authorized parties through the blockchain network;
verify the authenticity of the tokens associated with the carbon credits prior to authorizing any transactions for the tokens;
perform transactions for the tokens associated with the carbon credits in accordance with the smart contract; and
document the transactions for the tokens in a distributed ledger to ensure transparency and efficient utilization of the carbon credits.

17. The data platform of claim 16, wherein the set of instructions are further executed to:
record utilization of one of the carbon credits associated with one or more of the tokens as a retired credit associated with a non-fungible token.

18. The data platform of claim 16, wherein the data platform verifies that the authorized parties are allowed to utilize the carbon credits and perform transactions for the token.

19. The data platform of claim 16, wherein the one or more tokens represent blockchain tokens, and wherein the indicator is an encrypted hash, and wherein the tokens associated with the carbon credits are partially usable or transactable, and wherein a plurality of parties own portions of one of the tokens.

20. The data platform of claim 16, wherein the transactions are controlled utilizing the smart contract associated with the tokens and the carbon credits.

* * * * *